United States Patent
Gunn, III

(10) Patent No.: US 7,082,235 B2
(45) Date of Patent: Jul. 25, 2006

(54) STRUCTURE AND METHOD FOR COUPLING LIGHT BETWEEN DISSIMILAR WAVEGUIDES

(75) Inventor: Lawrence Cary Gunn, III, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 86 days.

(21) Appl. No.: 10/242,682

(22) Filed: Sep. 10, 2002

(65) Prior Publication Data

US 2003/0068152 A1    Apr. 10, 2003

Related U.S. Application Data

(60) Provisional application No. 60/318,446, filed on Sep. 10, 2001.

(51) Int. Cl.
*G02B 6/26* (2006.01)

(52) U.S. Cl. .............................. 385/28; 385/14; 385/50

(58) Field of Classification Search .................. 385/14, 385/27–29, 43, 49, 50, 122, 129–132
See application file for complete search history.

(56) References Cited

U.S. PATENT DOCUMENTS

| | | | |
|---|---|---|---|
| 3,462,211 A | 8/1969 | Nelson et al. | |
| 3,970,364 A | 7/1976 | Gerson et al. | |
| 3,976,358 A | 8/1976 | Thompson | |
| 4,420,873 A | 12/1983 | Leonberger et al. | |
| 4,728,167 A | 3/1988 | Soref et al. | |
| 4,776,655 A | 10/1988 | Robertson et al. | |
| 4,787,691 A | 11/1988 | Lorenzo et al. | |
| 4,857,973 A | 8/1989 | Yang et al. | |
| 4,874,216 A | 10/1989 | Utaka et al. | |
| 4,877,299 A | 10/1989 | Lorenzo et al. | |
| 4,956,682 A | 9/1990 | Ohmaka et al. | |
| 4,958,898 A | 9/1990 | Friedman et al. | |
| 4,999,686 A | 3/1991 | Autier et al. | |
| 5,001,523 A | 3/1991 | Lomashevich et al. | |

(Continued)

FOREIGN PATENT DOCUMENTS

EP    0 726 477 A2    8/1996

(Continued)

OTHER PUBLICATIONS

Ph. Lalanne et al., Modal conversion with artificial materials for photonic-crystal waveguides, *Optics Express*, vol. 10, No. 8, Apr. 22, 2002, pp. 354-359.

(Continued)

*Primary Examiner*—Edward J. Glick
*Assistant Examiner*—Thomas R. Artman
(74) *Attorney, Agent, or Firm*—Knobbe, Martens, Olson & Bear, LLP

(57) ABSTRACT

A strip loaded waveguide comprises a slab and a strip, wherein the strip is separated from the slab. Nevertheless, a guiding region is provided for propagating an optical mode and this guiding region extends both within the strip and the slab. A layer of material having an index of refraction lower than that of the strip and the slab may be disposed between and separate the strip and the slab. In one embodiment, the slab comprises a crystalline silicon, the strip comprises polysilicon or crystalline silicon, and the layer of material therebetween comprises silicon dioxide. Such waveguides may be formed on the same substrate with transistors. These waveguides may also be electrically biased to alter the index of refraction and/or absorption of the waveguide.

20 Claims, 10 Drawing Sheets

U.S. PATENT DOCUMENTS

| | | | |
|---|---|---|---|
| 5,003,359 A | 3/1991 | Abeles | |
| 5,033,812 A | 7/1991 | Yoshida et al. | |
| 5,048,907 A | 9/1991 | Wickman et al. | |
| 5,061,030 A | 10/1991 | Miyamoto et al. | |
| 5,078,516 A | 1/1992 | Kapon et al. | |
| 5,101,459 A | 3/1992 | Sunagawa | |
| 5,109,464 A | 4/1992 | Munowitz et al. | |
| 5,125,065 A | 6/1992 | Stoll et al. | |
| 5,132,843 A | 7/1992 | Aoyama et al. | |
| 5,146,513 A | 9/1992 | Inoue et al. | |
| 5,148,507 A | 9/1992 | Tanisawa | |
| 5,199,092 A * | 3/1993 | Stegmueller | 385/50 |
| 5,200,939 A | 4/1993 | Nishiwaki et al. | |
| 5,222,162 A | 6/1993 | Yap et al. | |
| 5,225,740 A | 7/1993 | Ohkawa | |
| 5,303,319 A | 4/1994 | Ford et al. | |
| 5,314,107 A | 5/1994 | d'Aragona et al. | |
| 5,329,601 A | 7/1994 | Nakamura | |
| 5,347,601 A | 9/1994 | Ade et al. | |
| 5,436,991 A | 7/1995 | Sunagawa et al. | |
| 5,459,807 A | 10/1995 | Doumuki et al. | |
| 5,491,768 A | 2/1996 | Chan | |
| 5,534,824 A | 7/1996 | Nalos et al. | |
| 5,546,494 A | 8/1996 | Eda | |
| 5,613,020 A | 3/1997 | Uchida et al. | |
| 5,625,725 A | 4/1997 | Nakano et al. | |
| 5,625,729 A | 4/1997 | Brown | |
| 5,654,818 A | 8/1997 | Yao | |
| 5,682,455 A | 10/1997 | Kovacic et al. | |
| 5,684,817 A | 11/1997 | Houdre et al. | |
| 5,703,989 A | 12/1997 | Khan et al. | |
| 5,737,474 A | 4/1998 | Aoki et al. | |
| 5,742,433 A | 4/1998 | Shiono et al. | |
| 5,745,630 A | 4/1998 | Vawter et al. | |
| 5,759,453 A | 6/1998 | Kato | |
| 5,784,400 A * | 7/1998 | Joannopoulos et al. | 372/96 |
| 5,841,931 A | 11/1998 | Foresi et al. | |
| 5,889,898 A | 3/1999 | Koren et al. | |
| 5,908,305 A | 6/1999 | Crampton et al. | |
| 5,917,981 A | 6/1999 | Kovacic et al. | |
| 5,955,749 A | 9/1999 | Joannopoulos et al. | |
| 6,052,495 A | 4/2000 | Little et al. | |
| 6,055,342 A | 4/2000 | Yi et al. | |
| 6,101,300 A | 8/2000 | Fan et al. | |
| 6,108,464 A | 8/2000 | Foresi et al. | |
| 6,134,369 A * | 10/2000 | Kurosawa | 385/132 |
| 6,151,430 A | 11/2000 | Traver, Jr. et al. | |
| 6,175,671 B1 | 1/2001 | Roberts | |
| 6,195,187 B1 | 2/2001 | Soref et al. | |
| 6,229,947 B1 | 5/2001 | Vawter et al. | |
| 6,243,517 B1 | 6/2001 | Deacon | |
| 6,261,525 B1 | 7/2001 | Minaee | |
| 6,278,822 B1 | 8/2001 | Dawnay | |
| 6,285,813 B1 | 9/2001 | Schultz et al. | |
| 6,374,001 B1 | 4/2002 | Bozeat et al. | |
| 6,396,984 B1 * | 5/2002 | Cho et al. | 385/43 |
| 6,400,490 B1 | 6/2002 | Hosoi | |
| 6,411,752 B1 | 6/2002 | Little et al. | |
| 6,466,342 B1 | 10/2002 | Frigo et al. | |
| 6,507,681 B1 | 1/2003 | Kowalczyk et al. | |
| 6,614,977 B1 | 9/2003 | Johnson et al. | |
| 6,631,225 B1 * | 10/2003 | Lee et al. | 385/28 |
| 6,633,696 B1 | 10/2003 | Vahala et al. | |
| 6,636,668 B1 | 10/2003 | Al-hemyari et al. | |
| 6,731,846 B1 * | 5/2004 | Hosomi et al. | 385/123 |
| 6,734,453 B1 | 5/2004 | Atanackovic et al. | |
| 6,768,855 B1 | 7/2004 | Bakke et al. | |
| 6,801,702 B1 | 10/2004 | Day | |
| 2002/0031321 A1 | 3/2002 | Lee et al. | |
| 2002/0094183 A1 | 7/2002 | Wu et al. | |
| 2002/0164118 A1 | 11/2002 | Paddon et al. | |
| 2002/0164129 A1 | 11/2002 | Jackson | |
| 2002/0164143 A1 | 11/2002 | Csutak et al. | |
| 2003/0002766 A1 | 1/2003 | Pruneri et al. | |
| 2003/0031446 A1 | 2/2003 | Gao et al. | |
| 2003/0190107 A1 | 10/2003 | Walker | |
| 2004/0076362 A1 * | 4/2004 | Wong et al. | 385/14 |

FOREIGN PATENT DOCUMENTS

| | | |
|---|---|---|
| EP | 0 751 409 A2 | 1/1997 |
| GB | 2 243 241 A | 10/1991 |
| JP | 63-106605 | 5/1988 |
| JP | 406201934 A | 7/1994 |
| JP | 2001-4877 | 1/2002 |
| WO | WO 02/082134 A1 | 10/2002 |
| WO | WO 02/082146 A1 | 10/2002 |
| WO | WO 3107051 A2 * | 12/2003 |

OTHER PUBLICATIONS

U.S. Appl. No. 10/241,284, filed Sep. 9, 2002, entitled Strip Loaded Waveguide With Low-Index Transition Layer.

U.S. Appl. No. 10/242,136, filed Sep. 9, 2002, entitled Strip Loaded Waveguide Integrated With Electronics Components.

U.S. Appl. No. 10/242,314, filed Sep. 10, 2002, entitled Tunable Resonant Cavity Based on the Field Effect in Semiconductors.

U.S. Appl. No. 10/242,313, filed Sep. 10, 2002, entitled Modulator Based on Tunable Resonant Cavity.

U.S. Appl. No. 10/242,318, filed Sep. 10, 2002, entitled Tuning the Index of a Waveguide Structure.

U.S. Appl. No. 10/241,285, filed Sep. 9, 2002, entitled Electronically Biased Strip Loaded Waveguide.

Azzam, R. M. A. and N. M. Bashara, "Generalized Ellipsometry for Surfaces with Directional Preference: Application to Diffraction Gratings," *J. Opt. Soc. Am.* vol. 62, No. 12, Dec. 1972, pp. 1521-1523.

Ogawa, K., W. S. C. Chang, B. L. Sopori, and F. J. Rosenbaum, "A Theoretical Analysis of Etched Grating Couplers for Integrated Optics," *IEEE J. Quantum Electron.*, vol. QE-9, No. 1, Jan. 1973, pp. 29-42.

Neviere, M., R. Petit, and M. Cadilhac, "About the Theory of Optical Grating Coupler-Waveguide Systems," *Optics Comm.* vol. 8, No. 2, Jun. 1973, pp. 113-117.

Neviere, M., P. Vincent, R. Petit and M. Cadilhac, "Systematic Study of Resonances of Holograpic Thin Film Couplers," *Optics Comm.*, vol. 9, No. 1, Sep. 1973, pp. 48-53.

Neviere, M., P. Vincent, R. Petit and M. Cadilhac, "Determination of the Coupling Coefficient of a Holographic Thin Film Coupler," *Optics Comm.*, vol. 9, No. 3, Nov. 1973, pp. 240-245.

Ulrich, R., "Efficiency of optical-grating couplers," *J. Opt. Soc. Am.*, vol. 63, No. 11, Nov. 1973, pp. 1419-1431.

Marcuse, D., "Exact Theory of TE-Wave Scatterings From Blazed Dielectric Gratings," *The Bell Systems Technical Journal*, vol. 55, No. 9, Nov. 1976, pp. 1295-1317.

Tamir, T. and S. T. Peng, "Analysis and Design of Grating Couplers," *Appl. Phys.*, 14, 235-254 (1977).

Yariv, A. and M. Nakamura, "Periodic Structures for Integrated Optics," *IEEE J. Quantum Electron*, vol. QE-13, No. 4, Apr. 1977, pp. 233-253.

Loewen, E. G. and M. Neviere, "Dielectric coated gratings: a curious property," *Appl. Optics*, vol. 16, No. 11, Nov. 1977, pp. 3009-3011.

Maystre, D., "A new general integral theory of dielectric coated gratings," *J. Opt. Soc. Am.*, vol. 68, No. 4, Apr. 1978, pp. 490-495.

Lee W., and W. Streifer, "Radiation loss calculations for corrugated dielectric waveguides," *J. Opt. Soc. Am.*, vol. 68, No. 12, Dec. 1978, pp. 1701-1707.

Tamir, T. *Integrated Optics*. Chapt. 3, Couplers, Springer-Verlag, New York, 1979, pp. 83-137.

Lee W., and W. Streifer, "Radiation loss calculations for corrugated dielectric waveguides. II. TM polarization," *J. Opt. Soc. Am.*, vol. 69, No. 12, Dec. 1979, pp. 1671-1676.

Chang, K. C. and T. Tamir, "Simplified approach to surface-wave scattering by blazed dielectric gratings," *Appl. Opt.* vol. 19, No. 2, Jan. 15, 1980, pp. 282-288.

Chang, K. C., V. Shah and T. Tamir, "Scattering and guiding of waves by dielectric gratings with arbitrary profiles," *J. Opt. Soc. Am.*, vol. 70, No. 7, Jul. 1980, pp. 804-813.

Miyanago, S. and T. Asakura, "Intensity profile of outgoing beams from uniform and linearly tapered grating couplers," *Appl. Opt.*, vol. 20, No. 4, Feb. 15, 1981, pp. 688-695.

Moharam, M. G. and T. K. Gaylord, "Diffraction anaylsis of dielectric surface-relief gratings," *J. Opt. Soc. Am.*, vol. 72, No. 10, Oct. 1982, pp. 1385-1392.

Gaylord, T. K. and M. G. Moharam, "Analysis and Applications of Optical Diffraction by Gratings," *Proc. IEEE*, vol. 73, No. 5, May 1985, pp. 894-937.

Suhara, T. and H. Nishihara, "Integrated Optics Components and Devices Using Periodic Structures," *IEEE J. Quantum Electronics*, vol. QE-22, No. 6, Jun. 1986, pp. 845-867.

Avrutsky, I. A., A. S. Svakhin and V. A. Sychugov, "Interference phenomena in waveguides with two corrugated boundaries," *J. Modern Optics*, vol. 36, No. 10, 1989, pp. 1303-1320.

Avrutsky, I. A., A. S. Svakhin and V. A. Sychugov, "High-efficiency single-order waveguide grating coupler," *Opt. Lett.*, vol. 15, No. 24, Dec. 15, 1990, pp. 1446-1448.

Li, L. and M. C. Gupta, "Effects of beam focusing on the efficiency of planar waveguide grating couplers," *Appl. Opt.*, vol. 29, No. 36, Dec. 20, 1990, pp. 5320-5325.

Gupta, M. C. and L. Li, "Effect of beam defocus on the efficiency of planar waveguide grating couplers," *Appl. Opt.*, vol. 30, No. 30, Oct. 20, 1991, pp. 4402-4405.

Bates, K. A., L. Li, R. L. Roncone and J. J. Burke. "Gaussian beams from variable groove depth grating couplers in planar waveguides." *Appl. Opt.* vol. 32, No. 12, Apr. 20, 1993, pp. 2112-2116.

Najafi, S. I., M. Fallahi, P. Lefebvre, C. Wu and I. Templeton, "Integrated Optical Circular Grating Tap Power Divider," *Electron. Lett.*, vol. 29, No. 16, Aug. 5, 1993, pp. 1417-1418.

L.C. West et al., "Non-uniform grating couplers for coupling of Gaussian beams to compact waveguides," *Intergrated Photonics Research Technical Digest*, Optical Society of America, 1994, 3 pages.

L.C. West, C. Roberts, J. Dunkel, G. Wojcik and J. Mould, "Non-uniform grating couplers of Gaussian beams to compact waveguides," Preprint of paper for IPR Tech. Dig., OSA, 1994.

Hagberg, M., N. Eriksson, T. Kjellberg and A. Larsson, "Dependence of output grating efficiency on detuning in surface grating output couplers," *Opt. Lett.*, vol. 20, No. 2, Jan. 15, 1995, pp. 180-182.

Moharam, M. G., D. A. Pommet, E. B. Grann and T. K. Gaylord, "Stable implementation of the rigorous coupled-wave analysis for surface-relief gratings: enhanced transmittance matrix approach," *J. Opt. Soc. Am. A*, vol. 12, No. 5, May 1995, pp. 1077-1086.

Schmitz, M., R. Brauer and O. Bryngdahl, "Gratings in the resonance domain as polarizing beam splitters," *Opt. Lett.*, vol. 20, No. 17, Sep. 1, 1995, pp. 1830-1831.

Pascal, D., R. Orobtchouk, A. Layadi, A. Koster and S. Laval, "Optimized coupling of a Gaussian beam into an optical waveguide with a grating coupler: comparison of experimental and theoretical results," *Appl. Opt.*, vol. 36, No. 12, Apr. 20, 1997, pp. 2443-2447.

Fallahi, M., K. J. Kasumic, S. Penner, O. Nordman and N. Peyghambarian, "Design and fabrication of circular grating coupled distributed Bragg reflector lasers," *Opt. Eng.*, vol. 37, No. 4, Apr. 1998, pp. 1169-1174.

Sheard, S. J., M. Li and T. D. Liao, "Waveguide Grating Couplers," obtained from www.eng.ox.ac.uk/~holsjs/research/files/Couplers.pdf on Apr. 14, 2003, original date online unknown.

Lalanne, P., J. Hazart, P. Chavel, E. Cambril and H. Launois, "A transmission polarizing beam splitter grating," *J. Opt. A: Pure Appl. Opt.*, vol. 1 (1999), pp. 215-219.

Backlund, J., J. Bengtsson, C. Carlstrom and A. Larsson, "Incoupling waveguide holograms for simultaneous focusing into multiple arbitrary positions," *Appl. Opt.*, vol. 38, No. 27, Sep. 20, 1999, pp. 5738-5746.

Backlund, J., J. Bengtsson, C Carlstrom and A. Larsson, "Multifunctional Grating Couplers for Bidirectional Incoupling into Planar Waveguides," *IEEE PTL*, vol. 12, No. 3, Mar. 2000, pp. 314-316.

Orobtchouk, R., A. Layadi, H. Gualous, D. Pascal, A. Koster and S. Laval, "High-efficiency light coupling in a submicrometric silicon-on-insulator waveguide," *Appl. Opt.*, vol. 39, No. 31, Nov. 1, 2000, pp. 5773-5777.

Moreno, E., E. Emi, C. Hafner and R. E. Kunz, "Theoretical Modeling and Optimization of Integrated Optical Nanostructures," CSEM—Scientific and Technical Report 2000.

Mossberg, T. W., "Planar holographic optical processing devices," *Opt. Lett.* vol. 26, No. 7, Apr. 1, 2001. pp. 414-416.

Backlund, J., J. Bengtsson, C Carlstrom and A. Larsson, "Waveguide Input Grating Coupler for Wavelength-Division Multiplexing and Wavelength Encoding," *IEEE Photon. Tech. Lett.*, vol. 13, No. 8, Aug. 2001, pp. 815-817.

Landru, N., D. Pascal and A. Koster, "Modelling of two-dimensional grating couplers on silicon-on-insulator waveguides using beam propagation method," *Opt. Comm.*, vol. 196, Sep. 1, 2001, pp. 139-147.

Mossberg, T. W., "Lithographic holography in planar waveguides," SPIE's International Technical Group Newsletter. Nov. 2001, vol. 12, No. 2., pp. 7-8.

Backlund, J., J. Bengtsson, C Carlstrom and A. Larsson, "Input waveguide grating couplers designed for a desired wavelength and polarization response," *Appl. Opt.*, vol. 41, No. 15, May 20, 2002, pp. 2818-2825.

Taillert, D., W. Bogaerts, P. Bienstman, T. F. Krauss, P. Van Daele, I. Moerman, S. Verstuyft, K. De Mesel and R. Baets, "An Out-of-Plane Grating Coupler for Efficient Butt-Coupling Between Compact Planar Waveguides and Single-Mode Fibers," *IEEE J. of Quantum Electron*, vol. 38, No. 7, Jul. 2002, pp. 949-955.

Ang, T.W. et al., "Highly efficient unibond silicon-on-insulator blazed grating couplers," *Applied Physics Letters* vol. 77, No. 25, Dec. 18, 2000, pp. 4214-4216.

Emmons, R.M. et al., "Buried-Oxide Silicon-on-Insulator Structures II: Waveguide Grating Couplers," *IEEE Journal of Quantum Electronics*, vol. 28, No. 1, Jan. 1992, pp. 164-175.

Moharam, M.G. and Gaylord, T.K., "Rigorous coupled-wave anaylsis of grating diffraction—E-mode polarization and losses," *J. Opt. Soc. Am.*, vol. 73, No. 4, Apr. 1983, pp. 451-455.

Li, L., "Symmetries of cross-polarization diffraction coefficients of gratings," *J. Opt. Soc. Am. A.*, vol. 17, No. 5, May 2000, pp. 881-887.

M. Palamaru et al., "Photonic crystal waveguides: Out-of-plane losses and adiabatic modal conversion," *Applied Physics Letters*, vol. 78, No. 11, Mar. 12, 2001, pp. 1466-1468.

T. Happ et al., "Photonic crystal tapers for ultracompact mode conversion," *Optics Letters*, vol. 26, No. 14, Jul. 15, 2001, pp. 1102-1104.

A. Talneau et al., "Low-reflection photonic crystal taper for efficient coupling between guide sections of arbitrary widths," *Optics Letters*, vol. 27, No. 17, Sep. 1, 2002, pp. 1522-1524.

Y. Xu et al., "Adiabatic coupling between conventional dielectric waveguides and waveguides with discrete translational symmetry," *Optics Letters*, vol. 25, No. 10, May 15, 2000, pp. 755-757.

E. Yablonovitch, "Photonic band-gap structures," *J. Opt. Soc. Am. B*, vol. 10, No. 2, Feb. 1993, pp. 283-295.

D. Labilloy et al., "Diffraction Efficiency and Guided Light Control by Two-Dimensional Photonic-Bandgap Lattices," *IEEE Journal of Quantum Electronics*, vol. 35, No. 7, Jul. 1999, pp. 1045-1052.

\* cited by examiner

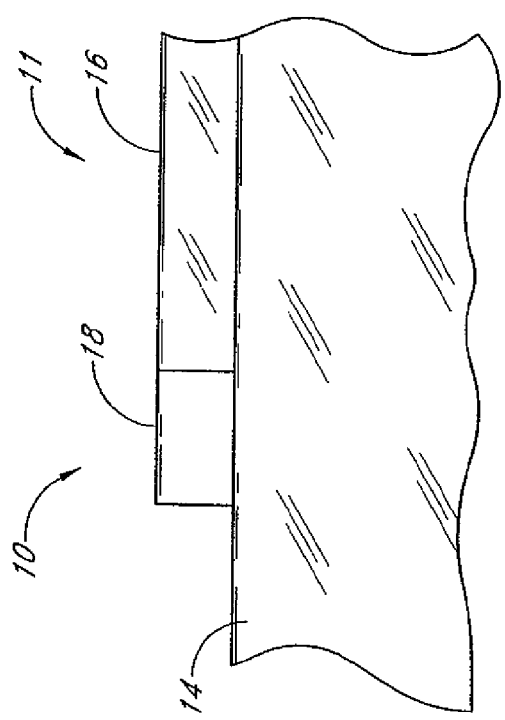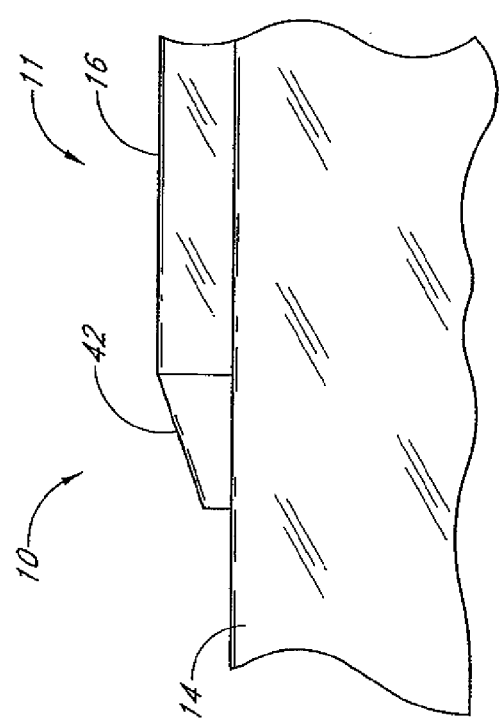

STRUCTURE AND METHOD FOR COUPLING LIGHT BETWEEN DISSIMILAR WAVEGUIDES

PRIORITY APPLICATION

This application claims the benefit of U.S. Provisional Application No. 60/318,446, entitled "Transition from Photonic Crystal to Ridge Waveguide," filed Sep. 10, 2001, the entire disclosure of which is hereby incorporated by reference herein and made a part of this specification.

BACKGROUND OF THE INVENTION

1. Field of the Invention

This invention generally relates to waveguides. More particularly, this invention relates to transitions between microstructure-doped waveguides and other types of waveguides.

2. Description of the Related Art

Light offers many advantages when used as a medium for propagating information, the foremost of which are increased speed and bandwidth. In comparison with electrical signals, signals transmitted optically can be switched and modulated faster and can include an even greater number of separate channels multiplexed together. Accordingly, lightwave transmission along optical fibers is widespread in the telecommunications industry. In an exemplary fiber optic communication system, a continuous wave (CW) beam of light may be emitted from a laser diode and modulated using an electro-optical modulator that is driven by an electrical signal. This electrical signal may correspond to voice or data which is to be transmitted over a distance between, e.g., two components in a computer, two computers in a network, or two phones across the country or the world. The light travels in an optical fiber to a location where it is detected by an optical sensor, which outputs voltage that varies in accordance with the modulation of the optical beam. In this manner, information can be rapidly transported from one location to another. To increase data throughput, numerous optical signals at different wavelengths can be multiplexed and transmitted together along a single optical path. This optical path can be switched selectively and varied to direct the optical signals to the appropriate destination.

Accordingly, various components have been developed to process and manipulate optical signals. Examples of such components include modulators, switches, filters, multiplexers, demultiplexers to name a few. Many of these components can be formed on a substrate. Accordingly, it is highly desirable to combine a variety of such components into a system that is integrated onto a single substrate. In such a system, optical waveguides theoretically could be used to propagate optical signals between components on the substrate. Waveguides can be fabricated in a wide variety of geometries, shapes, and configurations. What is needed are structures for efficiently optically connecting waveguides having different geometries.

SUMMARY OF THE INVENTION

An apparatus comprising integrated optics includes a waveguide having a cladding region which causes light to propagate along a core region of the waveguide. The waveguide comprises a microstructure-doped waveguide portion comprised of microstructures in a slab of material and an elongate waveguide portion having a core region comprised of elongate transmissive material. The microstructures are disposed in a cladding region of the microstructure-doped waveguide so as to define a core region in the microstructure-doped waveguide. The waveguide portions are optically coupled to propagate light therebetween in a transition region defined by at least one of the elongate transmissive material and the microstructures. The transition region includes a core region and an cladding region, wherein the cladding region of the waveguide confines light propagating through the core region of the waveguide. The confinement is significantly different in the microstructure-doped waveguide portion than in the elongate waveguide portion. The waveguide portions are configured such that the strength of the confinement gradually changes through the transition region.

In one aspect of the invention, an apparatus comprising integrated optics including a waveguide having a core and a cladding is provided. The waveguide comprises a strip loaded waveguide portion and a microstructure doped waveguide portion. The strip loaded waveguide portion is comprised of a strip of material on a planar slab of material. The strip defines a core portion and a cladding portion in the slab. The microstructure doped waveguide portion is comprised of microstructures in the slab of material. The microstructures are disposed in a cladding portion of the doped waveguide so as to define a core portion. The waveguide portions are optically coupled to propagate light therebetween in a transition region defined by both the strip and the microstructures. The core and cladding of the waveguide cooperate to confine light propagating through the waveguide. The confinement gradually increases in strength in passing from the striploaded waveguide portion to the microstructure doped waveguide portion.

In another aspect of the invention, a method comprises forming a first waveguide supporting an optical mode having a first propagation constant by providing a slab and forming a plurality of microstructures in the slab. The waveguide is patterned on a substrate to provide regions having different effective refractive indices. A second waveguide without microstructures is formed for supporting an optical mode having a second propagation constant significantly different than the first propagation constant. The waveguides are configured to provide an optical path between the waveguides such that the propagation constant of light traveling along the optical path gradually changes from one of the propagation constants to the other.

An apparatus comprising integrated optics includes a waveguide having a cladding region which causes light to propagate along a core region of the waveguide. The waveguide comprises a microstructure-doped waveguide portion comprised of microstructures disposed with respect to a slab of material and an elongate waveguide portion having a core region comprised of elongate transmissive material. The microstructures are disposed in a cladding region of the microstructure-doped waveguide so as to define a core region in the microstructure-doped waveguide. The waveguide portions are optically coupled to propagate light therebetween in a transition region defined by at least one of the elongate transmissive material and the microstructures. The transition region includes a core region and an cladding region, wherein the cladding region of the waveguide confines light propagating through the core region of the waveguide. The confinement is different in the microstructure-doped waveguide portion than in the elongate waveguide portion. The waveguide portions are configured such that the strength of the confinement gradually changes through the transition region.

BRIEF DESCRIPTION OF THE DRAWINGS

FIG. 5 is a side elevation view illustrating a tapered strip on the striploaded waveguide of FIG. 1.

FIG. 6 is a side elevation view illustrating another embodiment of a tapered strip on the strip loaded waveguide of FIG. 1.

DETAILED DESCRIPTION OF THE PREFERRED EMBODIMENT

Figure 1:
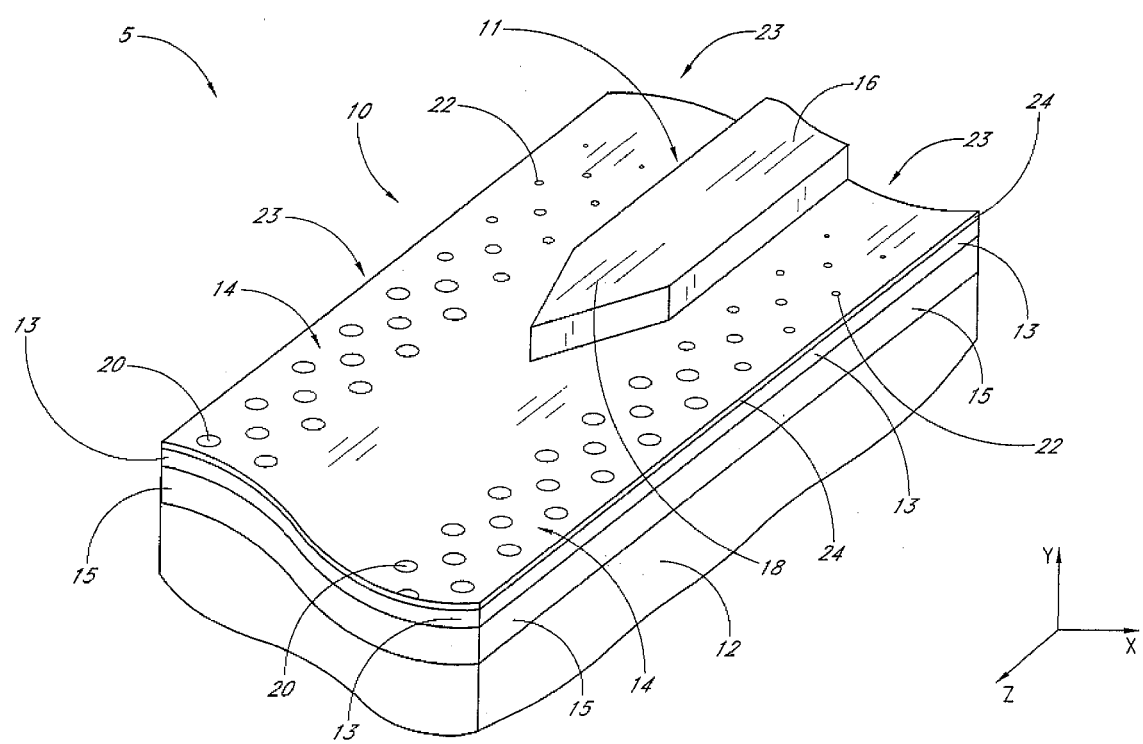
FIG. 1 is a perspective view of a structure for efficiently optically coupling a strip loaded waveguide and a microstructure-doped waveguide.

These and other embodiments of the present invention will also become readily apparent to those skilled in the art from the following detailed description of the preferred embodiments having reference to the attached figures, the invention not being limited to any particular embodiment(s) disclosed. Accordingly, the scope of the present invention is intended to be defined only by reference to the appended claims.

In general, optical waveguides comprise a core region comprising material that is at least partially transparent. This core region is surrounded by a cladding region that confines light within the core region. Some optical energy, often referred to as the evanescent energy or the evanescent field, however, may exist outside the core region and within the cladding region.

In certain waveguides, the core region comprises a first medium having a first refractive index, and the cladding region or cladding comprises a second medium having a second refractive index, the refractive index of the core region being greater than the refractive index of the cladding. A core/cladding interface is located at the boundary between the core region and the cladding. In such embodiments, when light in the core region is incident upon this core/cladding interface at an angle greater than the critical angle, the light is reflected back into the core region. This effect is referred to as total internal reflection. In this manner, optical signals can be confined within the core region due to total internal reflection at the core/cladding interface.

Waveguides can be fabricated in a wide variety of geometries and configurations. A channel waveguide is a specific type of waveguide that fits the description above. A channel waveguide generally comprises a core comprising a first medium having a relatively high refractive index surrounded by a relatively lower refractive index cladding. A buried channel or embedded strip waveguide generally comprises a core embedded in a substrate that forms at least part of the surrounding cladding.

A buried channel waveguide is an example of an integrated optical waveguide, which are generally associated with a substrate. The integrated optical waveguide may for example be situated on the substrate, in a substrate, or partially on and partially in the substrate. The integrated optical waveguide may be part of the substrate itself but preferably comprises of one or more layers of material positioned on a surface of the substrate. Examples of integrated optical waveguides include the channel waveguides discussed above, as well as slab waveguides, rib or ridge waveguides, and strip loaded waveguides.

In accordance with conventional usage in the art, optical components that are integrated onto a substrate with integrated optical waveguides, are collectively referred to herein as integrated optics. Such optical components may for example process, manipulate, filter, or otherwise alter or control optical signals propagating within the waveguides. As discussed above, these components themselves may be waveguides that guide light.

One of the simplest integrated optical waveguide configurations is the conventional slab waveguide. The slab waveguide comprises a thin, planar slab surrounded by cladding regions. The cladding regions may take the form of first and second (for example, upper and lower) cladding layers on either side of the slab. The two cladding layers need not comprise the same material. In this simplified example, the slab may be planar with substantially parallel planar boundaries at respective interfaces with the first and second cladding layers. Generally, the slab has a higher refractive index than either of the cladding layers. Light can therefore be confined in one dimension (e.g., vertically) within the slab. In this configuration of the slab waveguide, optical energy is not confined laterally to any portion of the slab, but extends throughout the slab due to total internal reflection at the planar boundaries between the slab and the surrounding upper and lower cladding layers.

A ridge or rib waveguide is formed by creating thickness variations in the slab. These thickness variations may be formed by depositing material on selected regions of the slab or by removing material from selected regions of the slab. The slab with the ridges or ribs formed thereon may be surrounded on opposite sides by the first and second (e.g., upper and lower cladding layers) comprising relatively low refractive index material. The thicker portions, i.e., the ridges or ribs, which comprise more slab material, will have a higher effective index than thinner region of the slab which comprise relatively lesser amounts of the slab material.

Accordingly, the region within the slab that is beneath the thicker portions and in proximity thereto has a higher effective refractive index than other portions of the slab. Thus, unlike the slab waveguide wherein optical energy propagates throughout the planar slab, the ridge or rib waveguide substantially confines optical energy to the region of the planar slab layer within and under the ridge and in close proximity thereto. In a ridge or rib waveguide, therefore, an optical signal can be propagated along a path in the slab defined by the region under which the ridge or rib is located. Thus, ridge waveguides defining any number and variations of optical pathways can be created by forming one or more ridges or ribs in the slab having the shape and orientation of the desired optical pathways.

Similarly, a strip loaded waveguide is formed by positioning a strip of material on the slab of a slab waveguide. The slab and the strip of material located thereon may be surrounded on opposite sides by the first and second (e.g., upper and lower) cladding layers having lower refractive index than the slab. Preferably, the strip has a refractive index that is greater than that of either cladding layer. The material comprising the strip may be different in composition than the material comprising the slab and these materials may have different refractive indices. Nevertheless, since the strip has an index of refraction higher than that of the upper cladding layer, the presence of the strip positioned on the slab induces an increase in effective index of the slab in the region beneath the strip and in proximity thereto.

As with the ridge or rib waveguide, the region within the slab that is beneath the strip and in close proximity thereto has a higher effective refractive index than other portions of the slab. Thus, the strip loaded waveguide can substantially confine optical energy to the region of the planar slab layer under the high-index strip, some of the optical energy also being within the strip itself. Accordingly, in a strip loaded waveguide an optical signal can be propagated along a path in the slab defined by the region over which the high-index strip is placed on the slab. Waveguides corresponding any number and variations of optical pathways, can be created by depositing one or more strips onto the slab having the shape and orientation of the desired optical pathways.

Another form of waveguide discussed in U.S. patent application Ser. No. 10/241,284 entitled "Strip Loaded Waveguide with Low-Index Transition Layer" filed Sep. 9, 2002, which is hereby incorporated herein by reference in its entirety, comprises a slab having a first refractive index iii and a strip having a second refractive index n2. In addition, the strip loaded waveguide structure has an intermediate layer having a third refractive index $n_3$. The intermediate layer is positioned between the slab and the strip, such that the slab and the strip do not directly contact each other. The refractive index of the intermediate layer n3 may be less than the refractive index of the slab $n_1$ and the refractive index of the strip $n_2$. The light within the slab is confined to portions beneath the strip because of the presence of the strip, despite the fact that the strip is separated from the slab. The intervening intermediate layer does not prevent the strip from determining the shape and location of the optical mode(s) supported in the slab. The presence of the strip positioned proximally to the slab portion induces an increase in effective index of the slab portion in the region directly under the strip and in proximity thereto. This increase in effective index defines a relatively high effective index guiding region wherein light in one or more supported optical modes is guided along the strip loaded waveguide. The strip loaded waveguide guides supported modes in the guiding region despite the presence of the intermediate layer between the slab and strip. In particular, the intermediate layer does not prevent the strip from altering the effective index within the slab and more particularly, from raising the effective index within the slab. Preferably, the intermediate layer has a thickness sufficiently small such that the strip can increase the effective index of the slab in regions immediately beneath and in the proximity thereto. The intermediate layer is sufficiently thin and the strip and the slab are sufficiently close, although physically separated by the intermediate layer, that the strip can affect the propagation of light within the slab. The intermediate layer also preferably has an index of refraction that is low in comparison with that of the strip and the slab.

In certain embodiments of the invention, semiconductor materials used in conventional processes for fabrication of semiconductor microelectronics are employed to create waveguide structures. These materials include, but are not limited to, crystalline silicon, polysilicon, and silicon dioxide ($SiO_2$). In particular, in various preferred embodiments of the strip loaded waveguide structures having intermediate layers, the slab comprises single crystal silicon, the intermediate layer comprises silicon dioxide, and the strip comprises polysilicon, although in other embodiments, the strip may comprise crystal silicon. The crystal silicon slab and the polysilicon strip are preferably doped although in portions of the slab and the strip that are not to be conductive, the slab and the strip are preferably undoped to minimize absorption losses.

As is well known, single crystal silicon is used to fabricate semiconductor microelectronics and integrated circuits (ICs), such as microprocessors, memory chips and other digital as well as analog ICs, and thus single crystal silicon is well characterized and its properties are largely well understood. The term single crystal silicon is used herein consistently with its conventional meaning. Single crystal silicon corresponds to crystalline silicon. Single crystal silicon, although crystalline, may include defects such that it is not truly a perfect crystal, however, silicon having the properties conventionally associated with single crystal silicon will be referred to herein as single crystal silicon despite the presence of such defects. The single crystal silicon may be doped either p or n as is conventional.

Single crystal silicon should be distinguished from polysilicon or "poly". Polysilicon is also used to fabricate semiconductor microelectronics and integrated circuits. The term polysilicon or "poly" is used herein consistently with its conventional meaning. Polysilicon corresponds to polycrystalline silicon, silicon having a plurality of separate crystalline domains. Polysilicon can readily be deposited for example by CVD or sputtering techniques, but formation of polyslicon layers and structures is not to be limited to these methods alone. Polysilicon can also be doped p or n and can thereby be made substantially conductive. In general, however, bulk polysilicon exhibits more absorption losses in the near infrared portion of the spectrum than a similar bulk single crystal silicon, provided that the doping, temperature, and other parameters are similar.

Waveguides and waveguide devices, such as for example optical switches, modulators, filters, couplers, multiplexers, and demultiplexers, can be implemented using various waveguide structures including but not limited to the types discussed above, e.g., channel, slab, rib or ridge, strip-loaded, and strip loaded waveguide structures with intermediate layers. Other types of waveguides are also possible.

One such waveguide is referred to herein as a microstructure-doped waveguide. Like the waveguides discussed above, microstructure-doped waveguides comprises a core region surrounded by one or more "effective" cladding regions. The effective cladding regions, however, include a plurality of microstructures that confine light within the core regions. In one embodiment, the microstructure-doped waveguide comprises a slab that provides vertical confinement of light therein. The effective cladding regions comprise a plurality of microstructures that provides lateral confinement within the slab, and more specifically, within the core regions of the slab. In one configuration, the plurality of micro-structures lowers the index of refraction of the slab. These microstructures may, for example, be filled with air or vacuum providing them with a refractive index lower than the slab, which may comprise, e.g., silicon. Accordingly, the average refractive index of the region in which the microstructures are located is less than the slab itself. The core region, having a relatively high refractive index in comparison with the microstructure-doped cladding regions provides a guided path for light to propagate.

Another type of microstructure-doped waveguide is referred to herein as a photonic crystal bandgap waveguide. In this waveguide, the microstructures are spatially arranged to produce a forbidden region wherein light within a specific band of wavelengths cannot propagate. This forbidden region corresponds to the effective cladding region. Accordingly, light is confined to the core by the surrounding cladding regions where the light cannot propagate. To produce the photonic bandgap, the microstructures are spatially arranged in an array such that light within the core that is incident on the array is coherently scattered so as to produce destructive interference within the effective cladding region and beyond. The intensity of the light within this cladding region is therefore substantially null. In contrast, the microstructures are spatially arranged so as to produce constructive interference within the core. In effect, the microstructures act together as coherent Bragg scatterers, directing light back into the core region. In this design, the microstructures themselves need not have a refractive index less than that of the slab. Instead, the microstructures may have a refractive index higher than the medium in which they are formed, i.e., the slab. Accordingly, the effective cladding region may have an average index of refraction higher than that of the core. Propagation within a relatively low index core, however, is still possible with such photonic band gap crystal waveguides.

It may be desirable to employ more than one type of waveguides such as those described above together on one substrate and to efficiently optically couple the two structures. For example, microstructure-doped waveguides such as photonic bandgap crystals can provide enhanced confinement in comparison to other waveguides such as some strip, ridge, or channel waveguides. Photonic crystal waveguides can also therefore have small feature sizes and may be used to implement a wide variety of functionalities. In contrast, some waveguides that do not comprise photonic bandgap crystal may provide less confinement than a photonic bandgap crystal waveguide. Accordingly, a first waveguide that is not a photonic bandgap crystals may, for instance, be useful in receiving light from an optical fiber, which supports an optical mode of relatively large spatial extent. Light may subsequently be optically coupled from the first waveguide into a second photonic bandgap crystal waveguide, which has smaller feature size or is otherwise advantageous for a particular application. Preferably, the light propagating within the first waveguide is efficiently optically coupled into the second waveguide, despite the difference in the two structures and the dissimilar properties they possess. This is just one example of the many reasons two different types of waveguides may be coupled together.

Figure 2:
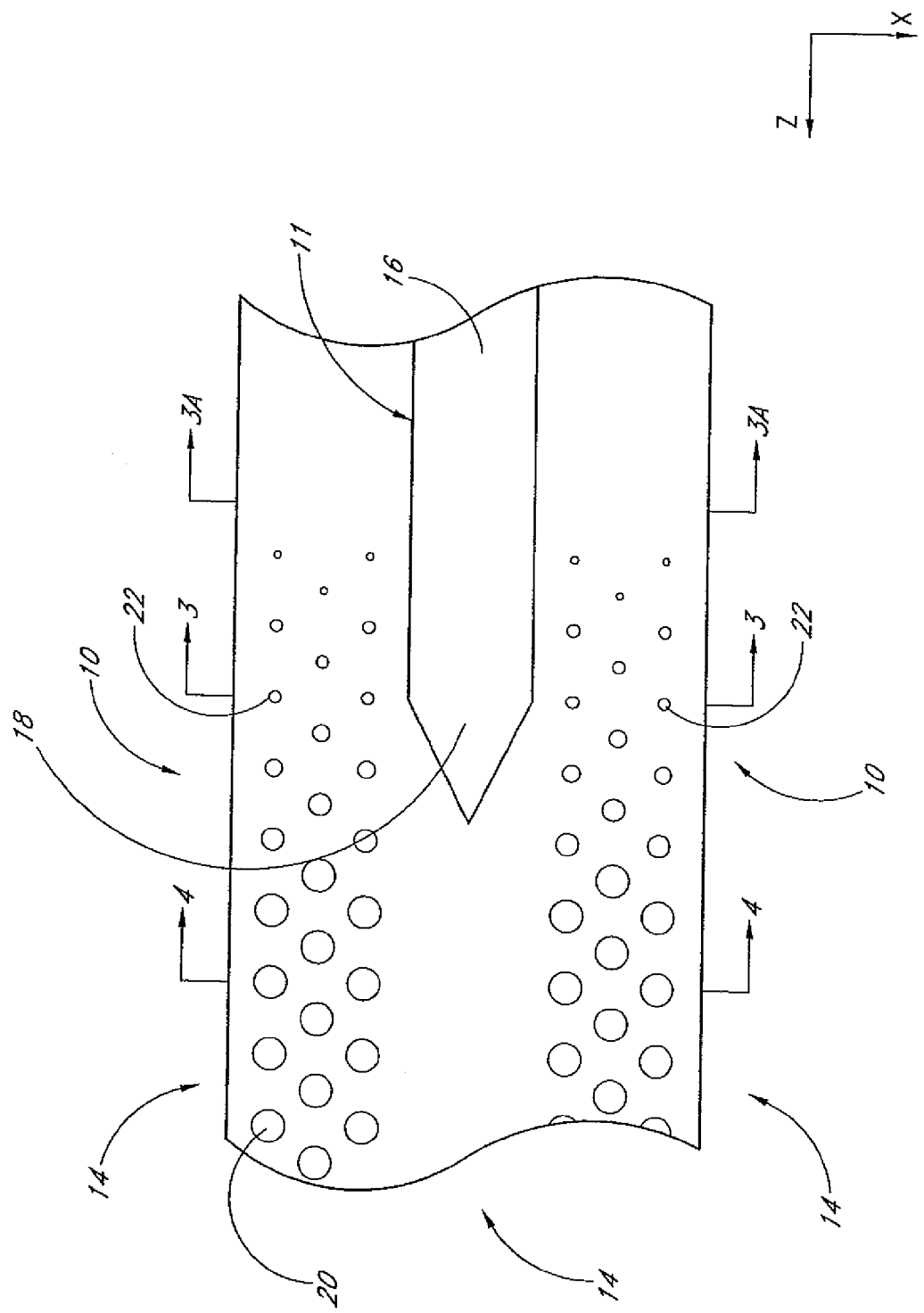
FIG. 2 is a top view of the structure illustrated in FIG. 1.
Figures 3, 3A, 4:
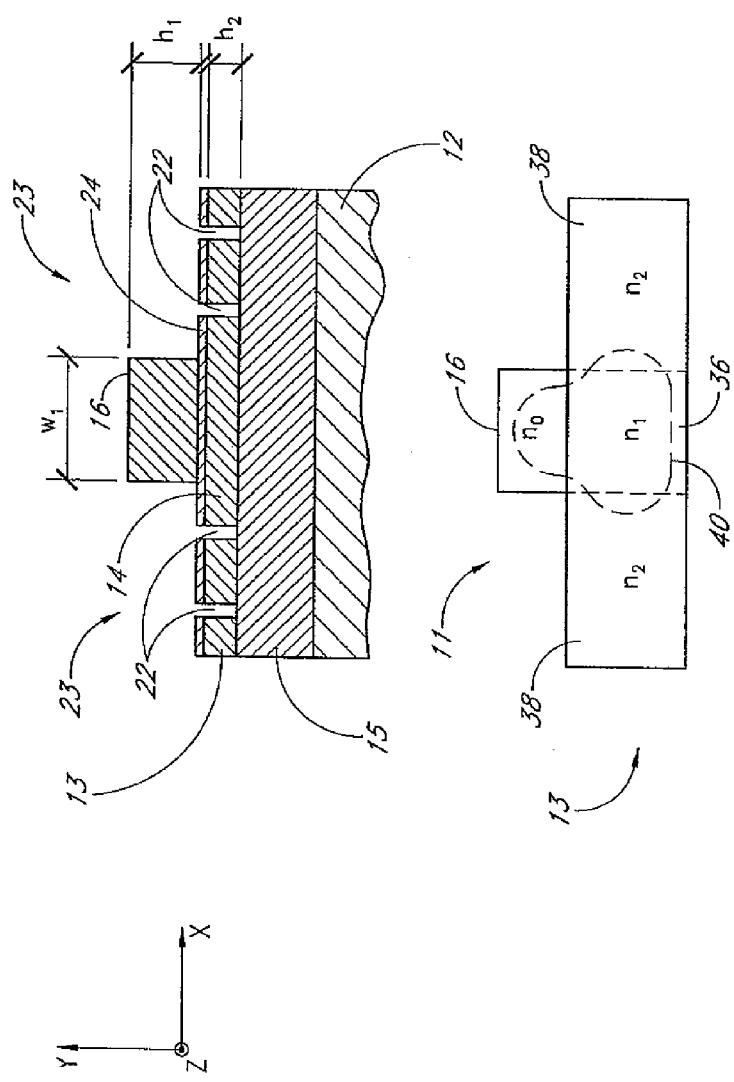
FIG. 3 is a cross-sectional view of the structure illustrated in FIG. 2, taken along line 3—3.
FIG. 3A is a diagrammatic view of a core region and effective cladding regions within the strip loaded waveguide of FIG. 2, taken along line 3A-3A.
FIG. 4 is a diagrammatic view of a core region and effective cladding regions within the microstructure-doped waveguide of FIG. 2, taken along line 4—4.

FIGS. 1 through 3 illustrate such a structure 5 for coupling together different types of waveguides, such as for example a photonic crystal waveguide and a waveguide that does not comprise photonic crystal. The structure 5 shown is particularly useful for optically coupling a microstructure-doped waveguide 14 and a strip loaded waveguide 11 having an intermediate layer between the strip and the slab as described above as well as in U.S. patent application Ser. No. 10/241.281 entitled "Strip Loaded Waveguide with Low-Index Transition Layer" filed Sep. 9, 2002, which is herein incorporated by reference in its entirety. More generally, however, the structures and techniques for optically coupling waveguides disclosed herein apply to a wide variety of waveguide types and are not restricted to only those waveguide types specifically recited. Preferably, however, these designs and methods are applied to optically couple microstructure-doped waveguides, such as photonic band gap crystal waveguides, to waveguides other than microstructure-doped waveguides.

The particular strip loaded waveguide 11 shown in FIGS. 1–4 comprises a planar slab 13 and a strip 16 formed thereon, wherein the strip is separated from the slab. The slab 13 is preferably substantially optically transmissive to the wavelength for which the waveguide 11 is designed. An intermediate layer 24 of material is disposed between and separates the strip 16 and the slab 13. Nevertheless, a guiding region 40 (see FIG. 3A) is provided for propagating an optical mode and this guiding region extends both within the strip 16 and the slab 13 as well as in the intermediate layer 24 therebetween. Preferably, this intermediate layer 24 comprises material having an index of refraction lower than that of the strip 16 and the slab 13, however, the refractive index of this material may be equal to or higher than that of the strip and the slab in other designs. In certain embodiments, the slab 13 and strip 16 comprise semiconductor and the intermediate region 24 comprises dielectric.

These strip loaded waveguides 11 are preferably located on a supporting structure or substrate 12. The supporting structure 12 serves to support the strip loaded waveguide 11 and preferably comprises a material such as a silicon or sapphire. Additionally, the supporting structure 12 may also include a cladding layer 15 (i.e., lower cladding), which aids in confining optical energy within the slab 13. Likewise, this lower cladding layer 15 preferably has a refractive index that is low in comparison to the refractive index of the slab 13.

In one preferred embodiment, the supporting structure 12 comprises a doped or undoped silicon substrate having a cladding layer 15 comprising silicon dioxide formed thereon. The silicon dioxide layer on the silicon substrate 12, with an index of approximately 1.5, serves as a lower cladding layer 15 for the slab 13.

Accordingly, the slab 13 is disposed either on the substrate 12 or on a layer 15 (preferably the cladding) formed over the substrate. This cladding layer 15 itself may be formed directly on the substrate 12 or may be on one or more layers formed on the substrate.

Referring to FIGS. 3 and 3A, in various preferred embodiments, the planar slab 13 is comprised of single crystal silicon and has a thickness, $h_2$, preferably between about $\lambda/6n$ and $\lambda/4n$, and more preferably about $\lambda/4n$, where n is the index of refraction of the slab and $\lambda$ is wavelength. This thickness of the slab 13 determines in part the optical mode or modes supported by the strip loaded waveguide 11 and depends partially on the geometry of the structure. In alternative embodiments, the slab 13 may comprise materials other than single crystal silicon and may be doped or undoped and thus may have different refractive indices. The slab 13, however, preferably comprises crystal silicon. Localized doping, such as used to create the source, drain, and channel regions in a transistor, may cause localized regions of the slab 13 to vary slightly. As discussed above, the lower cladding 15 may comprise silicon dioxide ($SiO_2$) having an index of refraction of about 1.5, especially in the case where the slab 13 comprises silicon.

In general, the strip 16 is disposed above and spaced-apart from the slab 13. The strip 16 is preferably comprised of polycrystalline silicon having an index of refraction no of approximately 3.5. In another embodiment, the strip 16 may be comprised of single crystal silicon having an index of refraction also about 3.5. An example of one such alternative material that may be used to form the strip is silicon nitride, which has an index of refraction of approximately 1.9.

The dimensions of the strip may vary and depend in part on the overall composition and geometry of the waveguide. As with the slab 13, the size of the strip 16 determines in part the number of modes to be supported by the waveguide 11 and the wavelength of these modes. In addition, the strip 16 may be undoped and may comprise materials other than polysilicon or crystal silicon, although these materials are preferred.

In certain embodiments, the dimensions of the strip loaded waveguide 11 can be selected such that only a single mode and single polarization can be propagated in the guiding region 40. These special strip loaded waveguides are single mode waveguides that in addition only support one polarization. In one example, for instance, the dimensions of the waveguide can be designed so as to support only the transverse-electric ("TE") fundamental mode. The TE mode corresponds to light having a polarization parallel to the interface between the slab 13 and intermediate layer 24 or the strip 16 and the intermediate layer 24 (that is, with the electric field is parallel to the x-z plane as defined in FIG. 1). For light having a wavelength of 1.55 μn, single TE mode operation can be obtained by configuring the thickness of the slab portion 13 to be approximately 110 nm, the thickness of the strip portion 16 to be approximately 95 nm, and the thickness of the intermediate layer 24 to be approximately 40 nm. The strip 16 has a width of about 0.5 micrometers. Finite difference time domain iterations and eigenmode solvers can be used to determine appropriate dimensions for other such strip loaded waveguides that supports a single TE mode. In this particular case, the slab portion 13 and the strip portion 16 both comprise single crystal silicon, and the intermediate layer 24 comprises silicon dioxide. However, specific embodiments with different materials and different dimensions can be obtained that support only a single polarization mode. Such a configuration may be particularly advantageous in certain polarization-dependent applications where only one polarization is required. Such a waveguide, for example, can act as a linear polarizer. These waveguides that support a single polarization of the fundamental mode may also be employed to minimize crosstalk.

Preferably, the refractive index of the intermediate layer 24 is less than the refractive index of the polysilicon strip and the crystalline silicon slab although the index of this layer should not be limited to any particular value or range of values. In various preferred embodiments, the intermediate layer comprises silicon dioxide having an index of refraction of approximately 1.5.

As will be appreciated by those skilled in the art, the strip loaded waveguide 11 and the microstructure-doped waveguide 14 may further include an upper cladding 23 formed over the strip 16 and the slab 13. Although in the illustrated embodiment of FIGS. 1-3, the upper cladding 23 comprises the surrounding air, it is contemplated that in other embodiments the upper cladding 23 may comprise one or more dielectric material such as for example glass, silicon dioxide ($SiO_2$) or other dielectrics. Other coating materials are also considered possible material. As indicated above, this upper cladding 23 may comprise one or more layers of material. Preferably, however, this coating 23 has a composite index of refraction lower than that of the slab 13 and the strip 16. The upper coating 23 may have an index or refraction equal to that of the intermediate layer 24 and may comprise the same material. Alternatively, the coating 23 may have a different index of refraction than the intermediate layer 24 and may comprise different material. This coating 23 may also provide electrical insulation between separate conductive pathways as well as serve as a cladding layer, providing confinement of optical energy within the slab 13 and the strip 12.

Confinement of light within the slab 13 is provided because the slab has a higher refractive index than the layers above and below. In one preferred embodiment, for example, light is confined within the silicon slab 13 because the silicon slab has a higher refractive index than the silicon dioxide coating 23 covering it. In addition, the silicon slab 13 has a higher index than the silicon dioxide cladding layer 15 immediately below it. Lateral confinement within the slab 13 is provided by the loading caused by the strip 12.

As depicted in FIG. 3A, the presence of the strip 16 defines a core region 36 disposed between two effective cladding regions 38 within the slab 13. The core region 36 is characterized by an effective index of refraction $n_1$, which is higher than an effective index of refraction $n_2$ within each of the effective cladding regions 38. Because the core region 36 has a higher effective refactive index than the effective cladding regions 38, light is confined within the core region 36 as it propagates through the striploaded waveguide 11. Although in the portion of the slab illustrated in FIG. 3A the slab comprises substantially the same material throughout the cross-section shown, the effective index varies as a result of the geometry. Accordingly, although the slab 13 does not comprise different to serve as cladding, an "effective" cladding 38 is provided by the overall geometry.

In this manner, light can be propagated longitudinally through specific guiding regions 40 within the slab 13. The guiding region 40 corresponds to a boundary where a specific portion of the optical energy within the mode, preferably the fundamental mode, is substantially contained and thus characterizes the shape and spatial distribution of optical energy in this mode. Accordingly, the guiding region 40 corresponds to the shape and location of the optical mode or modes in this strip loaded waveguide 11. In the guiding region, the electric field and the optical intensity are oscillatory, whereas beyond the guiding region, the evanescent field exponentially decays. For the strip loaded waveguide 11, the width $w_1$ of the strip 16 as well as the respective indices of refraction of the slab 13, the strip and the upper and lower claddings 23, 15 affect the cross-sectional size, i.e., the lateral spatial extent, of the guiding region 40.

Referring again to FIG. 1, a multiplicity of microstructures 20, 22 are formed in the planar slab 13 to produce the microstructure-doped waveguide 14. In a similar fashion as with the strip load waveguide 11, the intermediate layer 24 is disposed on the slab 13 and the coating layer 23 may be formed thereon to provide an upper cladding. In this case, however, the upper cladding 23 is air. In addition, the slab 13 is formed on the lower cladding 15 disposed on the substrate 12. The strip 16, however, is absent from this microstructure doped waveguide 14.

It will be appreciated that in the structure 5 shown in FIGS. 1 and 2, the planar slab 13, the upper and lower cladding 23, 15, as well as the intermediate layer 24 associated with the microstructure-doped waveguide 14 are essentially extensions of the same layers corresponding the strip loaded waveguide 11. In addition, both the strip loaded waveguide 11 and the microstructure-doped waveguide 14 are formed on the same substrate. However, the portion of the planar slab 13 comprising in the microstructure-doped waveguide 14 includes a plurality of the microstructures 20, 22. As such, the portion of the planar slab 13, the upper and lower cladding 23, 15, and the intermediate layer 24 associated with the microstructure-doped waveguide 14 have substantially the same properties (i.e., the layer thicknesses, indices of refraction, etc.) as those discussed above with respect to the portion of the planar slab 13, upper and lower cladding layers 23, 15, and the intermediate layer 24 included in the strip loaded waveguide 11. It will be appreciated, however, that in other embodiments the portions of the planar slab 13, the upper and lower cladding 23, 15, and intermediate layer 24, which are included in the microstructure-doped waveguide 14 and the striploaded waveguide 11 may be comprised of different materials, having different shapes, sizes, configurations and indices. Additional details regarding the fabrication and design of these layers can be found in the above-mentioned U.S. patent application No. 10/241,284 entitled "Strip Loaded Waveguide with Low-Index Transition Layer" filed Sep. 9, 2002, which is herein incorporated by reference in its entirety.

In the structure illustrated in FIG. 3, each of the microstructures 20, 22 comprises an air-filled opening in the planar slab 13. The size of these microstructures 20, 22 may vary with the specific application. In one embodiment, the microstructures 20, 22 are holes passing through the slab 13. The holes shown are cylindrical, and more specifically, have a shape corresponding to a right circular cylinder. The shape of the microstructures 20, 22, however, is not so limited, rather the microstructures can have other cylindrical and non-cylindrical shapes. For example, other cylindrical shapes having elliptical, square, rectangular, trapezoidal, and triangular, cross-sections are possible. These microstructure may be formed, for example, by etching and may have sloped sidewalls and rounded corners. Accordingly, the microstructures 20, 22 may be less than perfectly shaped and may be irregular.

In still other embodiments, the microstructures 20, 22 may be filled with a material other than air or vacuum. Preferably, this material has an index of refraction different than the slab 13 in which they are formed. In the structure illustrated in FIG. 3, the microstructures 20, 22 pass completely through the intermediate layer 24. The microstructures 20, 22, however, need not pass completely through the slab. In various other embodiments, the microstructures 20, 22, may be covered over by the intermediate layer 24.

As depicted in FIG. 4, the presence of the microstructures 20, 22 creates two effective cladding regions 34 and a core region 32 disposed therebetween within the planar slab 13. The core region 32 is characterized by an effective index of refraction $n_3$ which is higher than an effective index of refraction $n_4$ within the effective cladding regions 34. The air in the microstructures 20, 22 has a lower index of refraction than does the material comprising the slab 13 causing the average and effective index in the effective cladding regions 34 to be lower than the core region 32 of the slab 13. Since the core region 32 has a higher effective index of refraction than the effective cladding regions 34, light is laterally confined to a guiding region 40 within the core region 32 as it propagates through the microstructure-doped waveguide 14. The degree to which the indices of refraction $n_3$, $n_4$ differ from one another directly affects the strength of confinement of light within the core region 32 and thus the spatial extent (i.e., cross-section) of the guiding region 40. Higher index contrast, i.e. larger differences between the two indices, $n_3$, $n_4$, results in enhanced confinement and a smaller guiding region. In the case where the microstructures 20, 22 primarily act to lower the refractive index of the effective cladding regions 34, the particular shapes of each of the microstructures is less critical. Rather the volume of material having different index than the slab 13 and its distribution within the slab determines in part the resultant effective refractive index of the effective cladding region 34.

As shown in FIG. 2, each of the microstructures 20, 22 is spaced from adjacent microstructures 20, 22 by a predetermined distance which affects the value of the effective index of refraction $n_4$ of the effective cladding regions 34. In one embodiment, a distance between the microstructures 20, 22 smaller than that shown in FIG. 2 may be utilized, thereby facilitating inclusion of a greater number of microstructures within the effective cladding regions 34. This induces a lower effective index of refraction $n_4$ within the effective cladding regions 34, and thus a larger difference between the effective index of refraction $n_4$ and the effective index of refraction $n_3$ of the core region 32 and enhances the confinement. In another embodiment, a larger spacing than that shown in FIG. 2 may be used, thereby facilitating inclusion of a smaller number of microstructures 20, 22 within the effective cladding regions 34. This induces a smaller difference between the effective index of refraction $n_4$ within the effective cladding regions 34 and the effective index of refraction $n_3$ of the core region 32 and reduces confinement. Thus, by controlling the distribution and concentration of the microstructures 20, 22 the confinement can be varied, for example to gradually change longitudinally along the optical path that the beam will follow.

Likewise, the effective index of refraction $n_4$ is affected by the size of the microstructures 20, 22. In one embodiment, the microstructures 20 may have a diameter (or other dimension) larger than the diameter of the microstructures 20 shown in FIGS. 1 and 2. This design induces a lower effective index of refraction $n_4$ within the effective cladding regions 34 and, thus, provides a higher index contrast difference between the core region 32 and the effective cladding region 34, producing increased confinement. In another embodiment, the microstructures 20 may have a smaller diameter (or other dimension) than the microstructures 20 shown in FIGS. 1 and 2, thereby providing a smaller index contrast between the core region 32 and the effective cladding regions 34 weakening the confinement.

In certain embodiments, the microstructures 20, 22 are arranged to create a photonic bandgap crystal. As discussed above, the microstructures 20, 22 can be spaced apart and located with respect to each other to coherently scatter light propagating from the core region 32 that is incident on the array of microstructures 20, 22 in the effective cladding region 34. The microstructures 20, 22 are positioned so as to scatter light and produce destructive interference within the effective cladding region 34 and constructive interference within the core region 32. In this fashion, the array of microstructures 20, 22 forms a photonic band gap crystal through which light cannot propagate, thereby confining the light to the core region 32.

In the case where the microstructures 20, 22 together form a photonic bandgap crystal, the microstructures can be filled with a material having a higher index of refraction than the slab 13. The effective index of refraction $n_4$ within the effective cladding regions 34 is subsequently higher than the effective index of refraction $n_3$ within the core region 32. However, the coherent scattering effect provided by the photonic bandgap crystal prevents light having a wavelength within a specific forbidden band from propagating inside and thus through the effective cladding region 34. Light can therefore be confined to the core region 32 even though the core region has a lower effective refractive index than the effective cladding region 34.

Since the microstructures 20, 22 comprise a material having a different refractive index than the slab 13, they will individually reflect and scatter light incident thereon. Preferably, the spacing and specific arrangement of the microstructures 20, 22 is selected to provide the appropriate coherent effect to deflect light of the desired wavelength back into the core region 32. Such photonic crystal band gap structures are well known. The structures 5 disclosed herein, however, need not be limited to conventional photonic crystal band gap waveguides 14. Instead, the structures described may be utilized to efficiently couple light to and from other types of microstructure-doped waveguides 14 and photonic crystal waveguide, those both well known and yet to be devised.

By increasing the size of the microstructure 20, 22, the strength of the scattering can be augmented. Other techniques which increase or decrease the scatter cross-section may also be employed to control the strength of scattering and of the resultant photonic crystal. Enhanced scattering within a photonic crystal bandgap waveguide 14 for example provides increased confinement of the optical mode within the core region 32. The spatial extent of the optical mode within the core region 32 can therefore be reduced in size.

As shown in FIGS. 1 and 2, the structure 5 for mating the microstructure-doped waveguide 14 and the strip loaded waveguide 11 includes a transition region 10 between the two types of waveguide to facilitate efficient optical coupling therebetween. This transition region 10 comprises feature variations which reduces backscatter and back-reflections for light being optical coupling, for example, from the strip loaded waveguide 11 to the microstructure-doped waveguide 14. With this design, less light is scattered and reflected back into the strip loaded waveguide 11.

As illustrated in FIGS. 1 and 2, transition region 10 comprises portions of the both microstructure-doped waveguide 14 and the striploaded waveguide 11, that is, in this transition region, the two waveguides types overlap. More specifically, the transition region 10 includes the slab 13 having the elongated strip 16 disposed thereon as well as the intermediate layer 24 between the strip and the slab. In the transition region 10, the slab 13 also includes microstructures 20, 22. These microstructures 22, however, are smaller than the microstructures 20 depicted in FIG. 1 and 2 outside the transition region 10. The small microstructures 22 gradually increase in size as the striploaded waveguide 11 transitions into the microstructure-doped waveguide 14. The increasing size of the small microstructures 22 provides a tapering feature which gradually changes the strength of confinement within the core region 32 of the microstructure-doped waveguide 14.

The strip 16 in the transition region 10 also terminates with a taper 18 where the striploaded waveguide 11 couples to the microstructure-doped waveguide 14. FIG. 5 illustrates one embodiment of the tapered region 18 comprising a narrowing of the lateral dimension or width of the strip 16. FIG. 6 illustrates an alternative embodiment of a tapered region 42 comprising a narrowing of the width $w_1$ of the strip 16 and a decrease in the height $h_1$ of the strip 16. The taper 18 (42) gradually changes the strength of confinement of light within the core region 36 and consequently the lateral spatial extent of the guiding region 30 within the core. The strength of confinement within the strip loaded waveguide 11 is preferably graded so as to substantially match the strength of confinement within the microstructure-doped waveguide 14 which is also preferably graded. The transition from the first waveguide 11 into the second waveguide 14 preferably is sufficiently long to curtail optical losses and may be more than tens of wavelengths, i.e., greater than about 10 to 100 wavelengths) but is not limited to this range. Increased propagation lengths through the coupling structure 5 are accompanied by a loss per unit distance. Accordingly, a trade-off exists between progressively rather than abruptly implementing the conversion between waveguide modes and the loss per unit length incurred by gradually transforming the optical mode from one to another.

Stronger confinement may be provided by the microstructure doped waveguide 14, for example, with certain photonic bandgap crystal waveguides. Stronger confinement means that the lateral spatial extent of the optical mode or modes supported within the core region 32 of the microstructure-doped waveguide 14 is small in comparison to the size of the optical mode or modes supported by the strip loaded waveguide 11. A mismatch in the sizes of the modes will create backward reflections and backscattering as well as other scattering and reflection losses when light is to be coupled from the strip-loaded waveguide 11 to the microstructure-doped waveguide 14 (or vice versa). The amount of backward reflection and backscatter is determined by the modal mismatch and can be characterized by the overlap integral and wavenumber mismatch.

To promote efficient coupling therebetween, the modes within the two types of waveguides are preferably matched, e.g., in size and shape. Accordingly, the confinement provided by the strip loaded waveguide 11 is reduced while the confinement of the microstructure-doped waveguide 14 is increased to substantially match the two. The tapering of the strip 16 serves to increase lateral confinement of the optical mode within the strip loaded waveguide 11 causing the width of the optical mode to be reduced. The tapered region 18 (42) serves the additional purpose of gradually directing a portion of the light propagating within the strip 16 down into the planar slab 13 as the light traverses the transition region 10. It will be appreciated that the tapered region 18 (42) preferably reduces or substantially eliminates backward directed reflections, scattering that might otherwise arise within the transition region 10 in absence of the tapered region 18 (42) and the gradual transition between the two types of waveguides.

The tapering of the strip loaded waveguide 11 may also progressively alter the effective index within the core region 32 such that the index of refraction does not abruptly change at the point where the strip loaded waveguide and the microstructure-doped waveguide 14 meet. Back reflections and scattering can therefore be reduced and/or minimized by providing a graded effective refractive index variation along the longitudinal propagation path of the beam traveling from the strip loaded waveguide 13 into the microstructure-doped waveguide 14 or, alternatively, from the microstructure-doped waveguide to the strip-loaded waveguide. Accordingly, light propagating through the transition region 10 will have a propagation constant with a magnitude that progressively changes from one end of the transition region 10 to another. In this manner, a first waveguide, supporting an optical mode having a first propagation constant can be efficiently optically coupled to a second waveguide supporting an optical mode having a second propagation constant that is different in magnitude from the first propagation constant. Similarly, the transition region 10 provides an effective index of the cores region 32 that changes from one end to another. This transition region 10 enables efficient optical coupling of light from a first core region having a first effective refractive index to a second core region having second effective index different than the first effective refractive index.

As shown in FIGS. 1 and 2, the small microstructures 22 are positioned adjacent to the tapered portion 18 of the striploaded waveguide 11. Small microstructures 22 are also positioned adjacent to the untapered portions of the strip 16. This latter set of microstructures 22 gradually increases confinement within the transition region 10 beyond what is provided in the strip-loaded waveguide 11 alone. This confinement is further increased with the taper 18 of the strip 16 in combination with the microstructures 22 adjacent thereto, which have larger cross-section than those adjacent the untapered portions of the strip. Even after the strip 16 has ended, the taper culminating at an apex, the cross-section of the microstructures 20, 22 are increased further to provide even more confinement. Thus, by including both microstructures 20, 22 and the strip 16 in the transition region 10, by grading the scatter cross-section of the microstructures 22, and by introducing the taper 18 in the strip, this configuration thereby progressively introduces more and more confinement for a beam propagating longitudinally through the transition region to the microstructure-doped waveguide 14. Any of these approaches may be employed alone or in combinations to progressively varying the effective index, the confinement, and the resultant spatial modes.

As discussed above, the transition region 10 provides a smoother, i.e., less abrupt, transition for light propagating from the strip-loaded waveguide 11 to the microstructure-doped waveguide 14. This structure 5, however, is reciprocal, and thus, the transition region 10 also improves coupling efficiently by reducing backward deflected power and scattering losses for optical power being coupled from the microstructure-doped waveguide 14 to the strip-loaded waveguide 11.

One method of fabricating the structure 5 illustrated in FIG. 1 includes forming a first microstructure-doped waveguide 14 by depositing material to form the planar slab 13. The intermediate layer 24 may be formed on this slab 13. A plurality of the microstructures 20, 22 is then patterned in the planar slab 13 of material to provide the core and effective cladding regions 32, 34 as discussed with reference to FIG. 4. A second waveguide is formed without the microstructures 20, 22. In the embodiment illustrated in FIGS. 1–4, the second waveguide comprises the strip loaded waveguide 11 having the intermediate layer between the strip and the slab. This strip 16 is formed on the slab 13 for example by well known patterning techniques although, the specific process is not to be limited to conventional methods. The gradation and tapering of these microstructures 20, 22 and strip 16 can be implemented during the respective patterning steps for the microstructures and the strip 16.

The second waveguide, however, may alternatively comprise other types of waveguides, such as, by way of example, a rib waveguide or a channel waveguide. Other types of waveguides are also considered possible. The waveguides 11, 14 are then configured to provide an optical path through the transition region 10 between the waveguides 11, 14, wherein the magnitude of the propagation constant of light therein gradually changes to from one end to another to accommodate waveguides having different geometries and properties. Preferably, this progression is monotonic although it may or may not be continuously increasing or decreasing. Preferably rate of change of the magnitude of the propagation constant and the effective index within the core region may be vary with different applications and geometries. Preferably, however, the change occurs over a distance may wavelengths long and more preferably, over a distant greater than tens of wavelengths, i.e. (more than about 20 to 80 or 100 wavelengths). The rate of change from one optical mode to another, however, is not limited to these ranges.

Advantageously, the structure 5 shown in FIGS. 1–3 may be manufactured using conventional integrated circuit fabrication processes. For instance, the supporting structure may comprise a commercially available silicon wafer with silicon dioxide formed thereon. Conventional "Silicon-on Oxide" (SOI) processes can be employed to form the silicon slab on the silicon wafer or on a sapphire substrate. Fabrication techniques for forming a crystal silicon layer adjacent an insulator include, but are not limited to, bonding the crystal silicon on oxide, SIMOX (i.e., use of ion implantation to form oxide in a region of single crystal silicon), or growing silicon on sapphire. Oxide formation on the silicon slab can be achieved with conventional techniques used in field effect transistor (FET) technology for growing gate oxides on a silicon active layers. Still other processes utilized in fabricating FETs can also be applied. In the same fashion that a polysilicon gate is formed on the gate oxide in field effect transistors, likewise, a polysilicon strip can be formed over the oxide transition region in the waveguide structure. This polysilicon strip can be patterned using well-known techniques such as photolithography and etching. Damascene processes are also considered possible. Accordingly, conventional processes such as those employed in the fabrication of Complementary Metal Oxide Semiconductor (CMOS) transistors can be used to create the waveguide structure 5. In other embodiments, crystalline silicon strips can be formed on the transition oxide region using conventional techniques such as SOI processing and CVD.

Another strategy for fabricating such a waveguide structures 10 is to obtain a commercially available SOI wafer which comprises a first silicon substrate having a first silicon dioxide layer thereon with a second layer of silicon on the first silicon dioxide layer. The aggregate structure therefore corresponds to $Si/SiO_2/Si$. The first silicon dioxide layer is also referred to as the buried oxide or BOX. A second silicon dioxide layer can be formed on the SOI wafer and polysilicon or silicon strips can be formed on this structure to create the elongated strip 16. The second silicon layer will corresponds to the substantially planar slab 13 and the second silicon dioxide layer formed thereon will correspond to the intermediate layer 24. The thickness of this second silicon dioxide transition layer can be controlled as needed. The polysilicon or silicon strips can be patterned for example using photolithography and etching. Damascene processes are also envisioned as possible.

In the case where the substrate 12 does not comprise silicon (with a layer of silicon dioxide on the surface), a slab 13 comprising crystal silicon can still be fabricated. For example, crystalline silicon can be grown on sapphire. The sapphire may serve as the lower cladding for the slab. Silicon nitride formed for example on silicon can also be a cladding for the slab. The formation of the intermediate layer 24 and the strip 16 on the silicon slab 13 can be performed in a manner as described above.

Other conventional processes for forming layers and patterning may also be used and are not limited to those specifically recited herein. Employing conventional processes well known in the art is advantageous because the performance of these processes is well established. SOI and CMOS fabrication processes, for example, are well developed and well tested, and are capable of reliably producing high quality products. The high precision and small feature size possible with these processes should theoretically apply to fabrication of strip-loaded waveguides as the material systems are similar. Accordingly, extremely small sized waveguide structures and components should be realizable, thereby enabling a large number of such waveguides and other components to be integrated on a single die. Although conventional processes can be employed to form the waveguides described herein, and moreover, one of the distinct advantages is that conventional semiconductor fabrication processes can readily be used, the fabrication processes should not be limited to only those currently known in art. Other processes yet to be discovered or developed are also considered as possibly being useful in the formation of these structures.

One additional advantage of these designs is that in various embodiments electronics, such as transistors, can be fabricated on the same substrate as the waveguide structures. Integration of waveguides and electronics on the same substrate is particularly advantageous because many systems require the functionality offered by both electronic, optical, electro-optical, and optoelectronic components. For example, resonant cavities, filters, modulators, switches, and other waveguide structures, can be optically connected together in a network of waveguides and electrically connected to control and data processing circuitry all on the same die. The integration of these different components on a single die is particularly advantageous in achieving compact designs.

It will be appreciated that although the waveguides 11, 14 illustrated in FIGS. 1–2 have substantially straight and elongate configuration, in other embodiments the waveguides 11, 14 may include of a variety of configurations and orientations, including corners, bends and intersections with other types of waveguides. Furthermore, although the strip loaded and microstructure doped waveguides 11, 14 illustrated in FIGS. 1–4 have a substantially rectangular cross-section, other cross-sectional shapes such as trapezoidal may be utilized. In addition, the arrangement, shape, and spacing of the microstructures 20, 22, in the microstructure-doped waveguide 14 may be different and may depend on the application, manufacturing, or performance specifications desired. Also, the waveguides 10, 14 can be coupled from or are coupled to other waveguides or other optical components, such as for example, modulators, switches, or detectors, which have waveguide input ports and the waveguide output ports. These optical components may also be waveguide structures.

Figure 7:
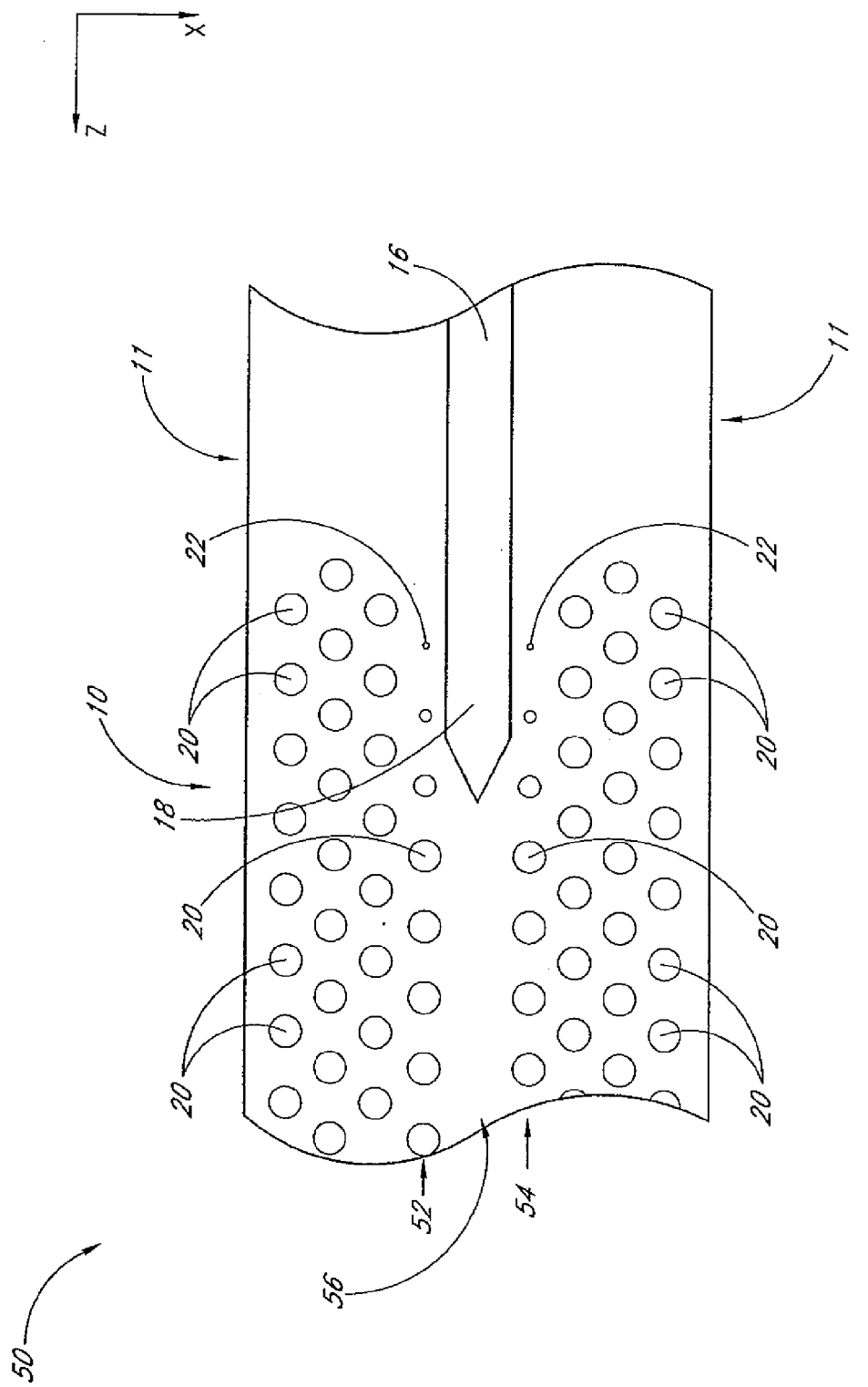
FIG. 7 is a top view of another structure for efficiently optically coupling a striploaded waveguide and a microstructure-doped waveguide.

Other arrangements can be utilized to produce a gradation in the transition region 10. FIG. 7 illustrates another structure 50 for transitioning from a strip loaded waveguide 11 to a microstructure-doped waveguide 56. The microstructure-doped waveguide 56 is substantially similar to the microstructure-doped waveguide 14 illustrated in FIGS. 1–4. However, the microstructure-doped waveguide 56 comprises two additional rows 52, 45 of microstructures 20, 22, and the small microstructures 22 are positioned within these rows 52, 54. As discussed above with reference to FIG. 4, the sizes of the microstructures 20, 22 affect the effective index of refraction of the material comprising the planar slab 13. The size of the microstructures 20, 22 also may alter the scatter cross-section of the microstructures 20, 22. As shown in FIG. 7, the rows 52, 54 contain small microstructures 22 in the transition region 10 where the microstructure-doped waveguide 56 overlaps with the strip loaded waveguide 11.

The small microstructures 22 gradually increase in size as the strip loaded waveguide 11 transitions into the microstructure-doped waveguide 56. The increasing size of the small microstructures 22 provides a gradation of the strength of confinement of light within the microstructure-doped waveguide 56. The strip 16 on the strip loaded waveguide 11 is also tapered in the transition region 10. As shown in FIG. 7, the small microstructures 22 are positioned adjacent of the tapered 18 of strip 16. The microstructures 22 are also located adjacent to portions of the strip 18 that are not tapered. This later group of microstructures 22 gradually increases confinement beyond that provided by the strip 16 alone. The coupling of the small microstructures 22 at the taper further enhances confinement. Preferably, the transition region 10 is configured such that the confinement changes smoothly from the weaker confinement provided by the strip loaded waveguide to the stronger confinement within the microstructure-doped waveguide 56. Similarly, the effective refractive index within the core regions 36 and 32 preferably is graded from the strip loaded waveguide 11 to the microstructure doped waveguide 14. Likewise, the propagation constant of the light within the respective cores will be gradually transformed. In addition, as discussed above with reference to FIGS. 5–6, the tapered strip 18 progressively directs more and more light propagating within the strip 16 into the planar slab 13 and into the microstructure-doped waveguide 56 as the light passes through the transition region 10. Consequently, the taper 18 of the strip 16 and variation of the small microstructures 22 reduces or substantially eliminates backward directed reflections, scattering, and other losses and inefficiency within the coupling structure 50. This enhanced coupling is provided for light propagating from the microstructure doped waveguide 14 to the striploaded waveguide 11 as well.

Figure 8:
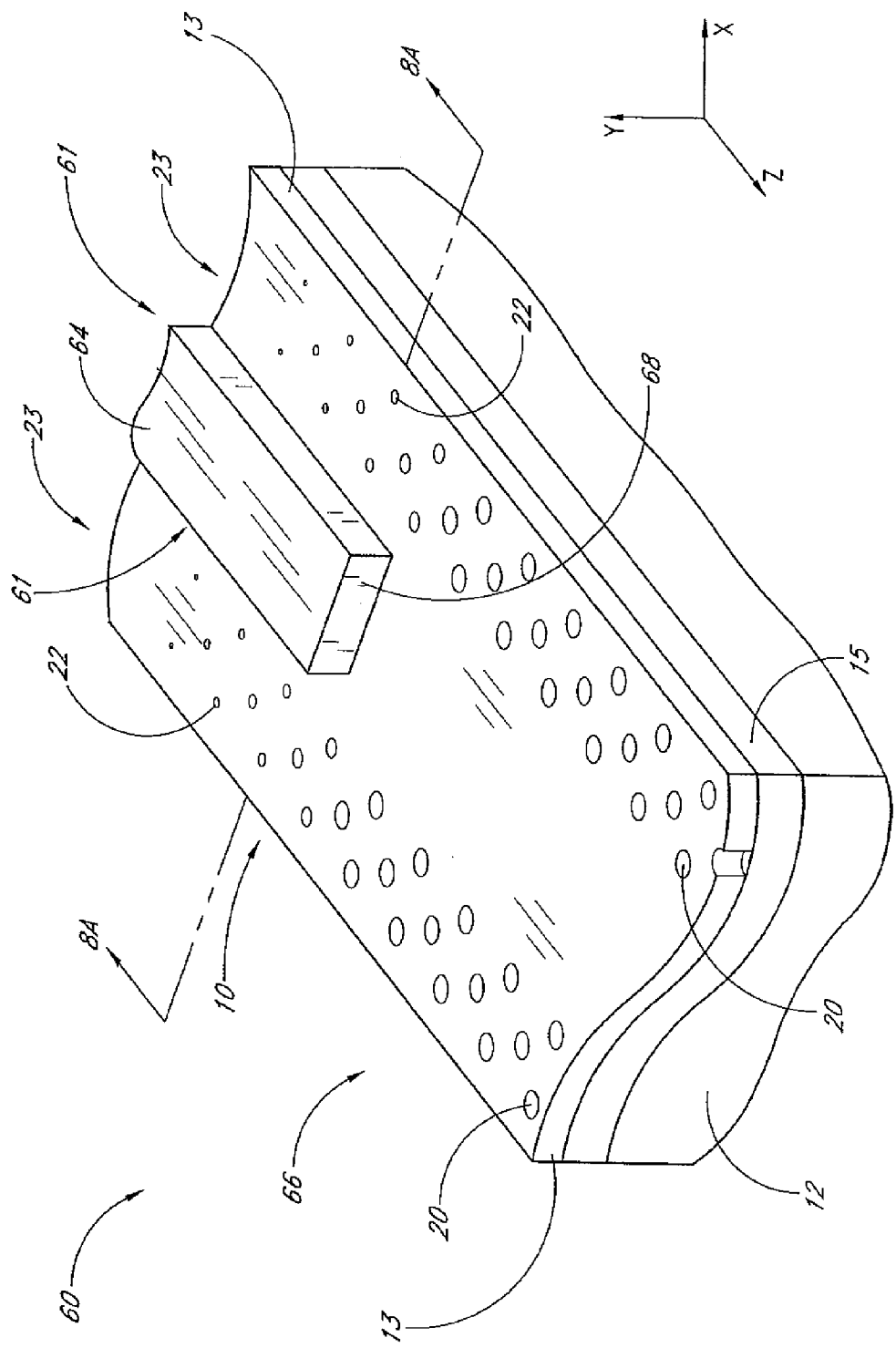
FIG. 8 is a perspective view of a structure for efficiently optically coupling a rib waveguide and a microstructure-doped waveguide.
Figure 8A:
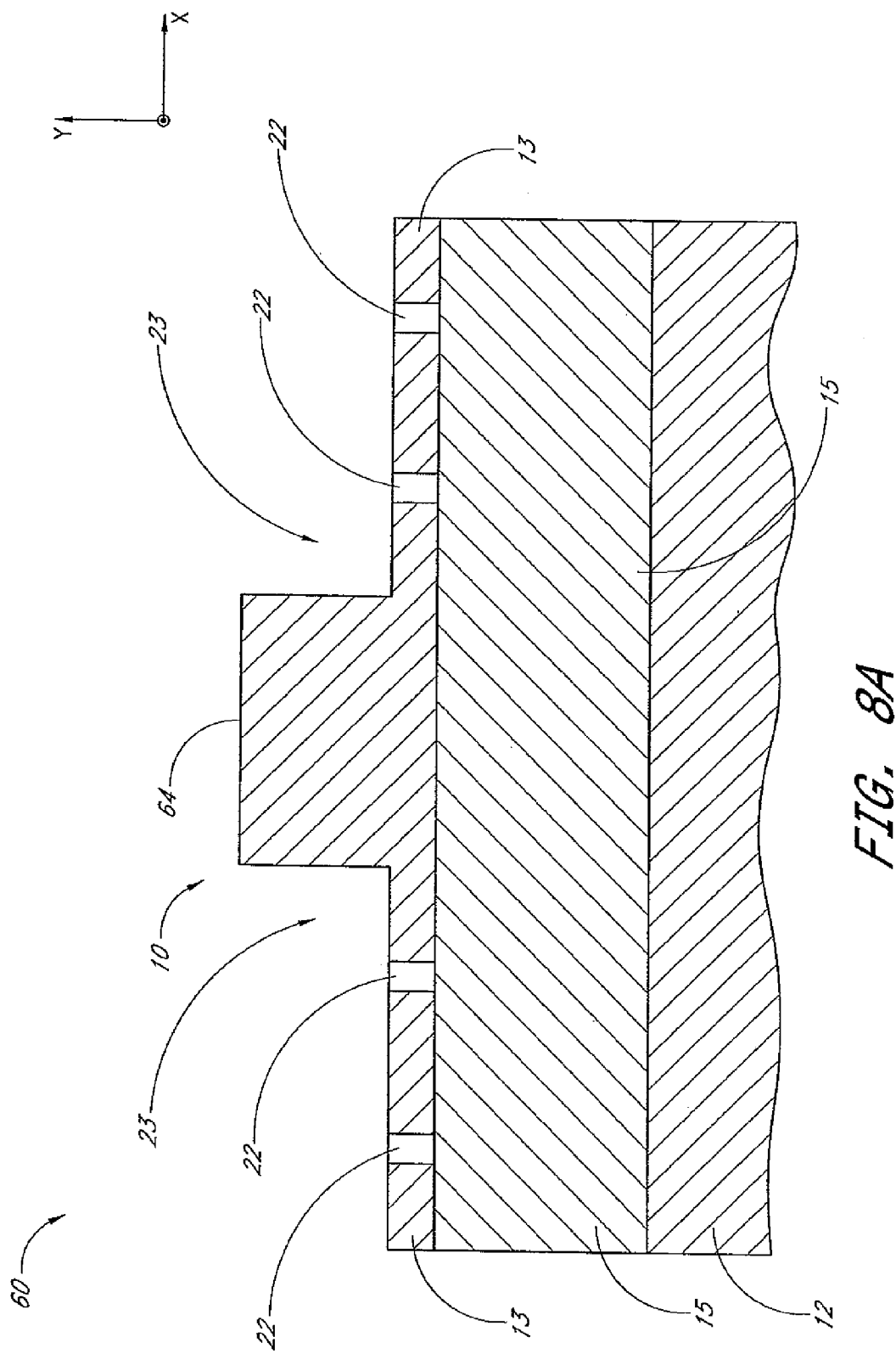
FIG. 8A is a cross-sectional view of the structure illustrated in FIG. 8, taken along line 8A—8A.

FIGS. 8 and 8A illustrate another embodiment of a structure 60 for coupling light between a rib waveguide 61 and a microstructure-doped waveguide 66. The microstructure-doped waveguide 66 is substantially similar to the microstructure-doped waveguide 14 illustrated in FIGS. 1–4, however, the microstructure-doped waveguide 66 does not include the intermediate layer 24. Both the microstructure-doped waveguide 66 and the ridge waveguide 61 share a planar slab 13 of material preferably substantially optically transmissive to the wavelength of operation. In the microstructure-doped waveguide 66, a plurality of microstructures 20, 22, some smaller than others, are present within the slab 13. The microstructures 20, 22 increase in size from a location proximal to rib waveguide 61 through the transition region 10 and into the microstructure-doped waveguide 66. In the rib waveguide 61, the planar slab 13 includes an elongate ridge 64. This ridge corresponds to a thickener portion of the slab 13. As described above, the microstructure-doped waveguide 66 comprises arrays of microstructures that form effective cladding regions 34 on opposite sides of a central core region 40.

An upper cladding 23 is preferably located above the rib waveguide 61 and the microstructure-doped waveguide 66 and more particularly, over the elongate ridge 64 and the slab 13. Although in the illustrated embodiment of FIGS. 8 and 8A, the upper cladding 23 comprises the surrounding air, it will be appreciated that in other embodiments the upper cladding 23 may comprise one or more layers of material such as glass, silicon dioxide ($SiO_2$) or other material. Preferably, however, this coating 23 comprises a dielectric material.

As with the structures described above, the planar slab 13 is disposed on a substrate 12 having a lower cladding 15 disposed thereon. In this case, lower cladding 15 is formed directly on the substrate 12 although in other embodiments the lower cladding material may be just one layer among many on the substrate. The lower cladding may comprise materials such as silicon dioxide, silicon nitride, or other similar dielectric materials, however, the lower cladding is not to be limited to these examples. Other materials are envisioned as possible. Preferably, however, both the lower and upper cladding layers 15, 23 comprise material having a lower refractive index than the slab 13 so as to confine light within a vertical direction within the slab, i.e., in the direction perpendicular to the planar slab.

As shown most clearly in FIG. 8A, the elongate ridge 64 extends from the slab 13 and corresponds to a region where the slab has increased thickness. The elongate ridge 64 may be formed, for example, by removal of material from the slab 13, such as by etching, cutting, and the like. The elongate ridge 64 extends along the length of the rib waveguide 61 and defines a core region disposed between two adjacent effective cladding regions within the planar slab 13. The core region is characterized by an effective index of refraction that is higher than an effective index of refraction within the effective cladding regions. Because the core region has a higher effective index of refraction than the effect cladding regions, light may be confined within the core region as it propagates through the rib waveguide 61 in a manner described above.

In the embodiment illustrated in FIG. 8, the elongate ridge 64 terminates with an end surface 68. In other embodiments, however, the elongate ridge 64 may include a tapered portion substantially similar to either of the tapered strips 18, 42 illustrated in FIGS. 5 and 6. This end surface 68, may be planar or have other shapes that may or may not provide tapering.

As shown in FIG. 8, the small microstructures 22 are positioned adjacent of the elongate ridge 64 beyond the end surface 68 of the rib waveguide 61. This combination of the small microstructures 22 together with the elongate ridge 64 increases the confinement above that provided by the rib waveguide 61 alone thereby facilitating a more gradual progression to the stronger confinement within the microstructure-doped waveguide 66. As shown, these microstructures progressively increase in size in the longitudinal direction from the rib waveguide 61 to microstructure-doped waveguide 66. Similarly, the effective refractive index and the magnitude of the propagation constant progressively changes from the rib waveguide 61 through the transition region 10 to the microstructure-doped waveguide 66. Configurations, however, that provide for faster or slower rates of change are also possible. The small microstructures 22 and the end surface 68 also gradually direct light propagating within the elongate ridge 64 into the planar slab 13 of the microstructure-doped waveguide 66 as the light traverses the transition region 10, thereby reducing or substantially eliminating backscattering, backward reflections, and other types of scattering losses.

As illustrated in FIGS. 8 and 8A, each of the microstructures 20, 22 comprises an air-filled hole passing through the planar slab 13. These holes, however, may be shaped differently. For example, these microstructures 20, 22 may have elliptical, square, triangular, or various other cross-sections. Moreover, these microstructures may have irregular shapes and may be rounded and have smoothed corners. Furthermore, in other embodiments, the microstructures 20, 22 may comprise a variety of different materials or combinations of materials instead of air or vacuum. Preferably, the material or materials forming the microstructure 20, 22 has a different index of refraction than the slab 13. These materials may, for example, be filled in holes such as illustrated in FIGS. 8 and 8A.

As discussed above, the rib waveguide 61 and the microstructure-doped waveguide 66, as well as the transition region 10, are preferably positioned on a substrate 12 which may includes an electrically insulating layer formed thereon. For example, the substrate may be a silicon wafer having a silicon dioxide ($SiO_2$) layer formed thereon. In alternative embodiments, however, other nonconductive substrate materials may be used to form the substrate such as sapphire. Also, the cladding layer may comprise materials other than silicon dioxide, such as for example, silicon nitride.

Although the waveguides 61, 66 illustrated in FIGS. 8 have a substantially straight and elongate configuration, in other embodiments of the waveguides 61, 66 may be comprised of a variety of configurations and orientations, including corners, bends and intersections with other types of waveguides. Furthermore, although the waveguides 61, 66 illustrated in FIGS. 8–8A may have a substantially rectangular cross-section, other cross-sectional shapes may be utilized, such as elliptical, circular, square, trapezoidal, or triangular, as well as combinations thereof.

Figure 9:
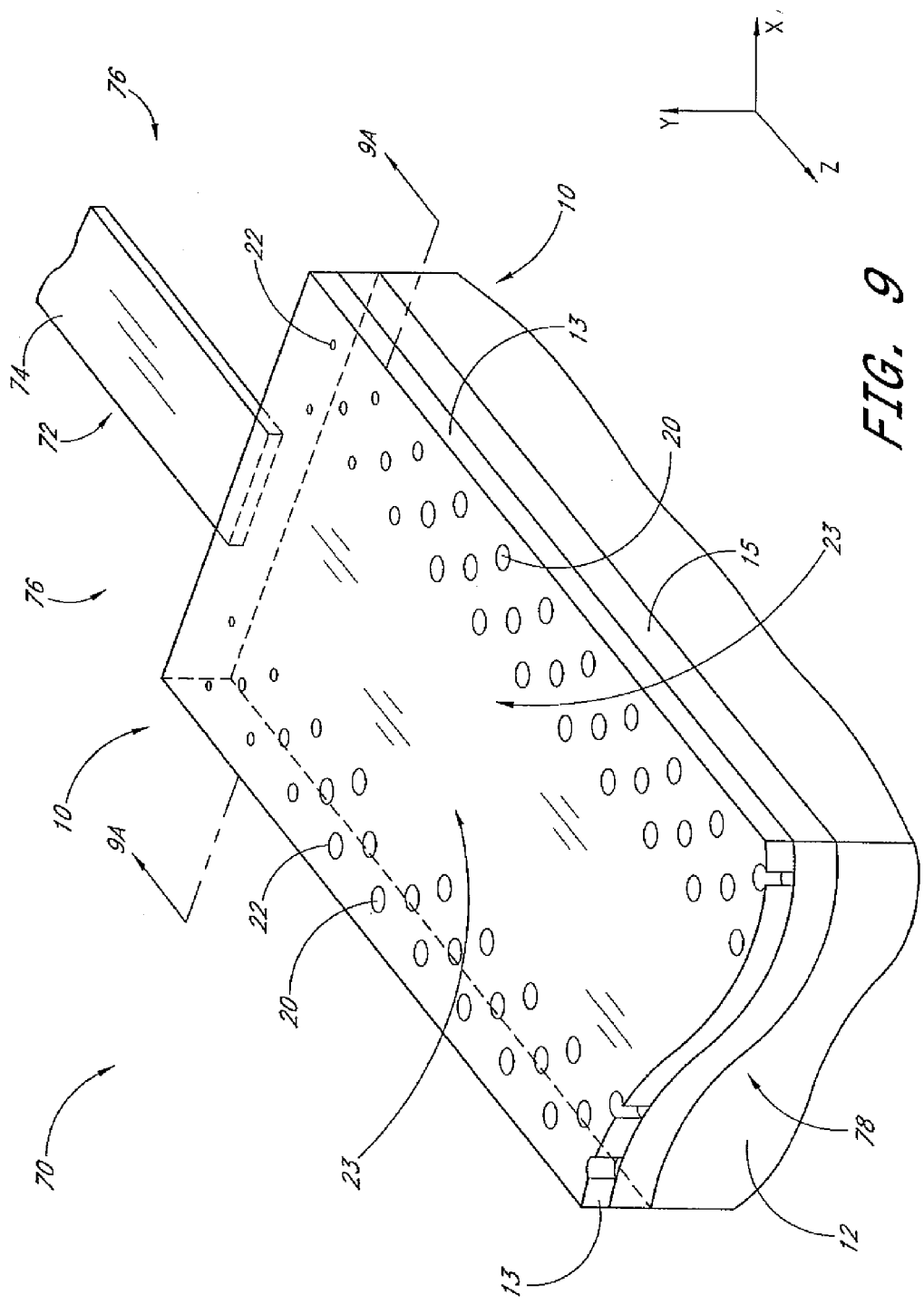
FIG. 9 is a perspective view of structure for efficiently optically coupling a channel waveguide and a microstructure-doped waveguide.
Figure 9A:
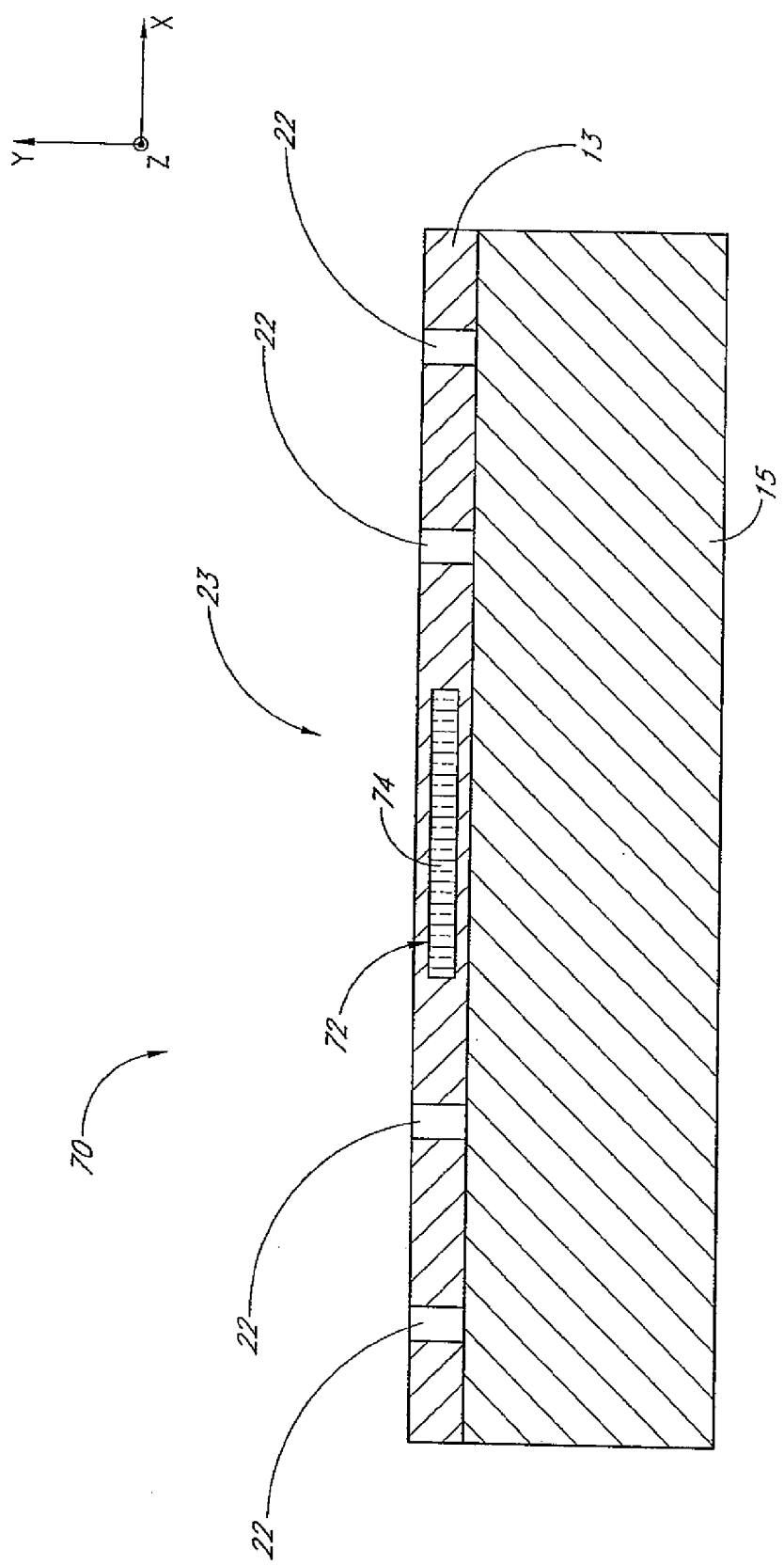
FIG. 9A is a cross-sectional view of the structure illustrated in FIG. 9, taken along line 9A—9A.

FIGS. 9 and 9A illustrate a structure 70 for optically coupling a channel waveguide 72 and a microstructure-doped waveguide 78. The microstructure-doped waveguide 78 is substantially similar to the microstructure-doped waveguide 14 illustrated in FIGS. 1–4 and comprises a planar slab 13 in which a plurality of microstructures 20, 22 some smaller than others, are disposed. The microstructure-doped waveguide 78, however, does not include the intermediate layer 24, although in various embodiments one or more layers of material may be formed on the slab 13. The planar slab 13 comprises material preferably substantially optically transmissive to the wavelength of operation. The microstructures 20, 22 in the slab 13 increase in size from a location proximal to channel waveguide 72.

As with the structures described above, the planar slab 13 is disposed on a substrate 12 having a lower cladding 15 formed thereon. In this case, lower cladding 15 is formed directly on the substrate 12 although in other embodiments, one or more layers may separate the lower cladding material from the substrate.

The microstructure-doped waveguide 78 further comprises an upper cladding 23 that is positioned above the upper surface of the core layer 13. Although in the illustrated embodiment of FIGS. 9 and 9A, the upper cladding 23 comprises the surrounding air, in other embodiments the upper cladding 23 may comprise low index material such as glass, silicon dioxide ($SiO_2$). Other materials, and more particularly, other dielectrics, may be employed to as the upper cladding 23.

As shown in FIG. 9, the channel waveguide 72 comprises a core region 74 surrounded by a cladding region 76. The core region 74 is comprised of a material substantially transmissive to the wavelength of light to be propagated therethrough. This material may be similar to the material comprising the slab 13 associated with the microstructure-doped waveguide 78. Alternatively, the core 74 may have a make-up different from that of the slab 13. The cladding region 76 surrounds the core region 74 and has an index of refraction that is lower than the index of refraction of the transmissive material comprising the core region 74. Although not required, the material or materials in the cladding region 76 may be the same material as in the upper cladding 23 on the microstructure-doped waveguide 78. In the structure 70 illustrated of FIGS. 9 and 9A, the cladding region 76 surrounding the core 74 of the channel waveguide 72 comprises air. However, in other embodiments, the cladding region 74 may comprise glass or silicon dioxide (SiO$_2$). Other materials, such as for example, polymer, may also be used. Preferably, however, this material comprises a dielectric. Since the core region 74 has a higher effective refractive index than the cladding region 76, light is confined within the core region 74 as it propagates through the channel waveguide 72.

In the embodiment illustrated in FIG. 9, the channel waveguide 72, is connected to the microstructure-doped waveguide 78 without any substantial overlap between the two. The channel waveguide 72 ends where the microstructure-doped waveguide begins. However, the microstructures 22 nearest the channel waveguide 72 are smaller and progressively increase in size at longitudinal distances farther from the channel waveguide. This progression in microstructure size provides a gradual increase in the effective refractive index, confinement, and magnitude of the propagation constant from the channel waveguide 72 to the microstructure-doped waveguide 78. This gradation will advantageously reduce backscatter and backward directed reflections.

It is contemplated that in other embodiments the channel waveguide 72 may continue into the slab 13 of the microstructure-doped waveguide 78 such that the two waveguides 72 and 78 overlap. The small microstructures 22 will be disposed adjacent of the channel waveguide 72. This combination of the small microstructures 22 with the channel waveguide 72 strengthens the confinement beyond what is provided by the channel waveguide alone. Thus, the confinement can continue progressively from the channel waveguide 72 to the microstructure-doped waveguide 78 where the confinement is higher.

It is further contemplated that in other embodiments, the core region 74 of the channel waveguide 72 can be tapered. For example, the width of the core can be made progressively narrower toward the end, which may be in the slab 13. In such embodiments, the small microstructures 22 may be replaced in their entirety with the larger microstructures 20, thereby substantially eliminating the taper feature from the microstructure-doped waveguide 78. However, in other embodiments, both the microstructure size and the core 74 of the channel waveguide 72 will be tapered. The channel waveguide 72 may get progressively smaller while the microstructure size gets progressively larger thereby providing a gradual transition in confinement through the transition region 10. Still, in other embodiments, other arrangements of the core 74 and microstructures 20, 22 may be utilized in conjunction with a variety of overlap distances.

As illustrated in FIGS. 9 and 9A, each of the microstructures 20, 22 comprises a right circularly cylindrical air-filled hole passing through the core layer 13 of the planar slab 13. As discussed above, however, holes may have other shapes such as elliptical, square, triangular, and rectangular, and may be rounded and irregular. The microstructures 20, 22 may also be filled with one or more material other than air. The filled microstructure 20, 22 preferably may have a refractive index higher or lower than that of the slab 13 in which the microstructures are formed. As discussed above, the microstructures 20, 22 can be spatially arranged to create a photonic crystal band-gap waveguide. With the photonic band-gap waveguide, light propagating through the microstructure-doped waveguide 14 is confined to the core region 32 by coherent scattering from the microstructures 20, 22.

Although the waveguides 72, 78 illustrated in FIGS. 9–9A have a substantially straight and elongate configuration, in other embodiments of the waveguides 72, 78 may be comprised of a variety of configurations and orientations, including but not limited to corners, bends, and intersections with other types of waveguides. Furthermore, although the waveguides 72, 78 illustrated in FIGS. 9–9A have a substantially rectangular crosssection, other cross-sectional shapes may be utilized, such as elliptical, circular, square trapezoidal, or triangular.

Figure 10:
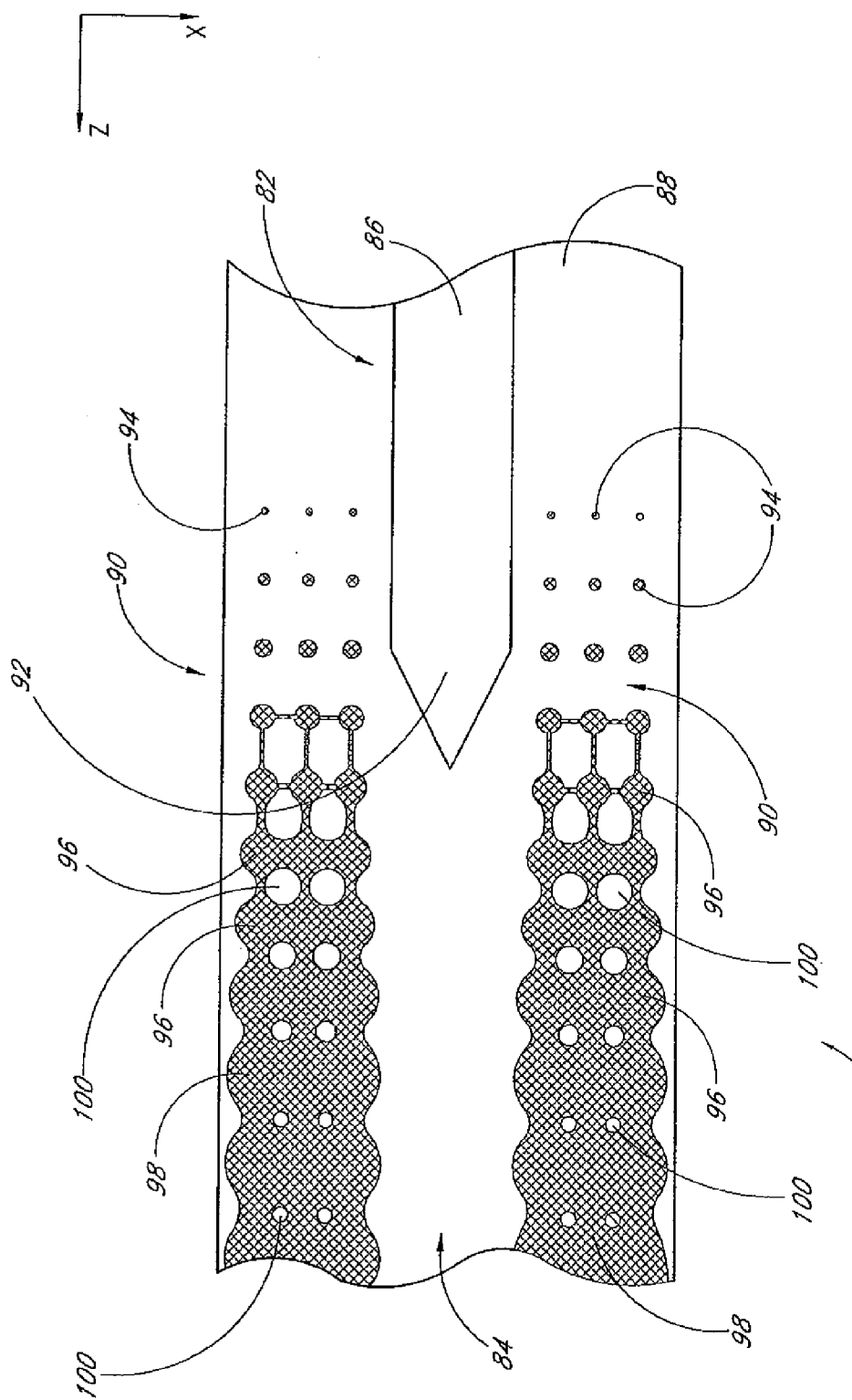
FIG. 10 is a top view of structure for optically coupling a strip loaded waveguide and a microstructure-doped waveguide, the microstructure-doped waveguide formed by a plurality of posts disposed on the slab of the strip waveguide.

Another version of a structure 80 for optically coupling a first strip loaded waveguide 82 with a second microstructure doped waveguide or more specifically photonic crystal waveguide 84 is illustrated in FIG. 10. As described above, the strip loaded waveguide 82 comprises a strip 86 formed on a slab 88. The strip loaded waveguide 82 and the photonic crystal waveguide 84 overlap in a transition region 90 of the structure 80. The strip 86 has a taper 92 at one end, this taper being located in the transition region 90. The photonic crystal 84 is formed by a plurality of posts 94, 96 disposed on the surface of the slab 88 with the strip 86. The posts 94, 96 comprise roughly columnar structures that extend from the surface of the slab 88. The posts 94 vary in size in a longitudinal directional (z) throughout the transition region 90. Small posts 94 are adjacent the untaper portion of the strip 86. These posts 94 are roughly right circularly cylindrical and from the top view shown in FIG. 10 have a well defined diameter, i.e., the posts 94 have a cross-section in a plane parallel to the slab 88 that approximates a circle.

The posts 94 increase in size, namely, in diameter progressively along the longitudinal direction (z) toward the taper 92 of the strip 86 and on through the transition region 90. As the size of the posts 94, 96 increases, the distance separating them is reduced. With larger size, the posts 94, 96 begin to merge together transforming into elevated regions 98 of material formed on the slab 88 having a plurality of holes 100 therein. The holes or cavities 100 also appear roughly circular from the top view shown in FIG. 10, that is, they have a cross-section parallel to the plane of the slab 88 that also approximates a circle. As the size of the posts 96 increases, the holes 100 formed by the array of posts decreases in size. These holes 100 can together form a microstructure-doped waveguide 84 as described above. They may be also positioned so as to create a photonic crystal which confines light within a core region of the microstructure-doped waveguide 84. This confinement may be weaker than the photonic crystal waveguides discussed above. One advantage of this geometry is that the slab 88 has contiguous pathways through it, which enable electrical connection to be formed in the waveguide.

Numerous variations of this design are possible. For example, the posts 94, 96 need not be restricted to right circularly cylindrical columns but may have other shapes and cross-sections and may be irregularly shaped, rounded, and smoothed. Although a square array of posts 94, 96 and holes 100 is shown, the arrangement is not so limited and may include hexagonal or triangular arrays for instance. The strip 86 may or may not be tapered, and overlap between the gradation in feature size in the microstructure-doped waveguide 84, and the strip loaded waveguide 82 is not necessary but is preferred.

The structure 80 may be formed from semiconductor materials. For example, the slab 88 and the strip 86 may comprise silicon. The slab 88 may be crystal silicon and the strip 86 may be poly or crystalline silicon. The columns 94, 96 formed on the slab 88 may comprise silicon, silicon dioxide, or silicon nitride or other materials as well. The structure 80 is not limited to strip waveguide 82, just a few other examples being rib or ridge waveguides as well as strip loaded waveguide with a low index transition region. Still other designs, geometries, and materials, are possible.

As described above, silicon is substantially optically transmissive to certain wavelengths of interest such as 1.55 microns. In addition, processes for fabricating silicon structures are well developed. For these reasons, waveguide structures comprising polysilicon and silicon are advantageous.

Although silicon is beneficial because it is substantially transparent at certain wavelengths, other materials and more particularly, other semiconductors may be employed. Furthermore, the structures described herein are not to be limited to any particular wavelength or wavelength range and may be designed, for example, for microwave, infrared, visible, and ultraviolet wavelengths.

Various embodiments have been described above. Although these embodiments have been described with reference to specific materials and configurations, the descriptions are intended to be illustrative only and are not intended to be limiting. It will be appreciated that various modifications and applications may occur to those skilled in the art without departing from the scope of the invention as defined in the appended claims.

What is claimed is:

1. An apparatus comprising integrated optics including a waveguide having a cladding regions that cause light to propagate along a core region of the waveguide, said waveguide comprising:
   a microstructure-doped waveguide portion comprised of microstructures in a slab of material, said microstructures disposed in cladding regions of said doped waveguide so as to define a core region in said microstructure-doped waveguide;
   an elongate waveguide portion having a core region comprised of elongate transmissive material, said elongate waveguide portion having dimensions such that said elongate waveguide portion supports only a transverse-electric mode;
   said waveguide portions optically coupled to propagate light therebetween in a transition region defined by at least one of said elongate transmissive material and said microstructures, said transition region including a core region and a cladding region;
   an upper cladding region comprising one or more dielectric materials formed over the microstructure-doped waveguide portion, and the elongate waveguide portion, the upper cladding region confining light propagating through the core region of the waveguide;
   one or more electronic components positioned proximate the upper cladding region, wherein the upper cladding region provides electrical isolation for the one or more electrical components;
   wherein the upper cladding region confines light propagating through the core region of the waveguide, said confinement being significantly different in said microstructure-doped waveguide portion than in said elongate waveguide portion, said waveguide portions configured such that the strength of said confinement gradually changes through said transition region, said elongate waveguide portion terminating with a taper in said transition region.

2. The waveguide of claim 1, wherein said microstructures have a cross-dimension in said transition region which increases along a direction parallel to said waveguide.

3. The waveguide of claim 1, wherein said microstructures are arranged to provide a crystal band gap waveguide.

4. The waveguide of claim 1, wherein said microstructures are comprised of a medium having a higher index of refraction than said slab.

5. The waveguide of claim 1, wherein said elongate waveguide portion comprises a striploaded waveguide comprising a strip.

6. The waveguide of claim 5, wherein said strip has a tapered width in said transition region.

7. The waveguide of claim 5, wherein said strip has a tapered height in said transition region.

8. The waveguide of claim 1, wherein said elongate waveguide portion comprises a rib waveguide comprising a rib.

9. The waveguide of claim 8, wherein said rib has a tapered width in said transition region.

10. The waveguide of claim 8, wherein rib has a tapered height in said transition region.

11. A method comprising: forming a first waveguide that supports an optical mode having a first propagation constant by providing material to form a slab and forming a plurality of microstructures in the slab;
   patterning the waveguide on a substrate to provide regions having different effective refractive indices;
   forming a second waveguide without microstructures having a second propagation constant having a magnitude significantly different than the first propagation constant, said second waveguide being configured to support only a transverse-electric mode;
   forming an electrically insulative layer over the first and second waveguides,
   positioning one or more electronic components proximate the electrically insulative layer so that the electrically insulative layer provides electrical isolation for the one or more electrical components; and
   configuring the waveguides to provide an optical path between the waveguides such that the propagation constant along the optical path gradually changes from one of the propagation constants to the other by at least in part tapering the second waveguide in a transverse dimension.

12. An apparatus comprising integrated optics including a waveguide having a cladding region which causes light to propagate along a core region of the waveguide, said waveguide comprising:
   a microstructure-doped waveguide portion comprised of microstructures disposed with respect to a slab of material, said microstructures disposed in a cladding region of said doped waveguide so as to define a core region in said microstructure-doped waveguide;
   an elongate waveguide portion having a core region comprised of elongate transmissive material, said elongate waveguide portion comprising a strip-loaded waveguide comprising a strip formed over said slab, said strip and said slab separated by an intermediate layer, said intermediate layer having a lower refractive index than said strip and slab;
   said waveguide portions optically coupled to propagate light therebetween in a transition region defined by at least one of said elongate transmissive material and said microstructures, said transition region including a core region and a cladding region;
   wherein the cladding region of the waveguide confines light propagating through the core region of the waveguide, said confinement being significantly different in said microstructure-doped waveguide portion than in said elongate waveguide portion, said waveguide portions configured such that the strength of said confinement gradually changes through said transition region, said strip terminating in a symmetrical taper in said transition region;

a dielectric layer formed over the microstructure-doped waveguide portion and the elongate waveguide portion, the dielectric layer forming a cladding for confining light propagating through the waveguide portions and an electrical isolation layer; and one or more transistors positioned with respect to the dielectric layer such that the dielectric layer provides electrical isolation for the one or more transistors.

13. The waveguide of claim 12, wherein said microstructures comprise posts formed on said slab of material.

14. The waveguide of claim 12, wherein said intermediate layer comprises a silicon-based dielectric.

15. The waveguide of claim 12, wherein said intermediate layer comprises silicon dioxide.

16. An apparatus comprising integrated optics including a waveguide having a cladding region which causes light to propagate along a core region of the waveguide, said waveguide comprising:

a microstructure-doped waveguide portion comprised of microstructures in a slab of material, said microstructures comprised of a medium having a lower index of refraction than said slab, said microstructures disposed in a cladding region of said doped waveguide so as to define a core region in said microstructure-doped waveguide;

an elongate waveguide portion having a core region comprised of elongate transmissive material, said waveguide portions optically coupled to propagate light therebetween in a transition region defined by at least one of said elongate transmissive material and said microstructures, said transition region including a core region and a cladding region, wherein the cladding region of the waveguide confines light propagating through the core region of the waveguide, said confinement being significantly different in said microstructure-doped waveguide portion than in said elongate waveguide portion, said waveguide portions configured such that the strength of said confinement gradually changes through said transition region, said elongate waveguide portion terminating with a taper in said transition region;

a dielectric layer formed over the microstructure-doped waveguide portion and the elongate waveguide portion, the dielectric layer confining light propagating through the core region of the waveguide; and one or more electronic components positioned proximate the dielectric layer, wherein the dielectric layer provides electrically isolation for the one or more electrical components.

17. The waveguide of claim 16, wherein said medium is air.

18. An apparatus comprising integrated optics including a waveguide having a cladding region which causes light to propagate along a core region of the waveguide, said waveguide comprising:

a microstructure-doped waveguide portion comprised of microstructures in a slab of material, said microstructures disposed in a cladding region of said doped waveguide so as to define a core region in said microstructure-doped waveguide; and an elongate waveguide portion having a core region comprised of elongate transmissive material, said elongate waveguide portion being a channel waveguide comprising a channel, said waveguide portions optically coupled to propagate light therebetween in a transition region defined by at least one of said elongate transmissive material and said microstructures, said transition region including a core region and a cladding region, wherein the cladding region of the waveguide confines light propagating through the core region of the waveguide, said confinement being significantly different in said microstructure-doped waveguide portion than in said elongate waveguide portion, said waveguide portions configured such that the strength of said confinement gradually changes through said transition region, said elongate waveguide portion terminating with a taper in said transition region;

a dielectric layer formed over the microstructure-doped waveguide portion and the elongate waveguide portion, the dielectric layer confining light propagating through the core region of the waveguide; and one or more electronic components positioned proximate the dielectric layer, wherein the dielectric layer provides electrical isolation for the one or more electrical components.

19. The waveguide of claim 18, wherein said channel has a tapered width in said transition region.

20. The waveguide of claim 18, wherein said channel has a tapered height in said transition region.

* * * * *